(12) United States Patent
Mabuchi et al.

(10) Patent No.: US 8,184,462 B2
(45) Date of Patent: May 22, 2012

(54) POWER CONVERSION APPARATUS, POWER CONDITIONER, AND POWER GENERATION SYSTEM

(75) Inventors: Masao Mabuchi, Moriyama (JP); Yasuhiro Tsubota, Moriyama (JP); Takao Mizokami, Ritto (JP); Hideaki Fujita, Tokyo (JP)

(73) Assignees: Omron Corporation, Kyoto (JP); Tokyo Institute of Technology, Tokyo (JP)

( * ) Notice: Subject to any disclaimer, the term of this patent is extended or adjusted under 35 U.S.C. 154(b) by 277 days.

(21) Appl. No.: 12/710,979

(22) Filed: Feb. 23, 2010

(65) Prior Publication Data

US 2010/0232192 A1    Sep. 16, 2010

(30) Foreign Application Priority Data

Mar. 13, 2009 (JP) .............................. P2009-061915

(51) Int. Cl.
*H02M 7/00* (2006.01)
*H02M 7/02* (2006.01)
(52) U.S. Cl. ........................................ 363/124; 363/65
(58) Field of Classification Search .................... 363/65, 363/71, 95, 97, 98, 123, 124, 131, 132, 133
See application file for complete search history.

(56) References Cited

U.S. PATENT DOCUMENTS

| | | | |
|---|---|---|---|
| 4,117,364 | A | 9/1978 | Baker |
| 5,430,639 | A * | 7/1995 | Takahashi ..................... 363/124 |
| 6,556,461 | B1 | 4/2003 | Khersonsky et al. |
| 7,692,938 | B2 * | 4/2010 | Petter ............................. 323/361 |
| 2002/0118559 | A1 * | 8/2002 | Kurokami et al. ............. 363/131 |
| 2005/0030683 | A1 * | 2/2005 | Tailliet ............................ 361/18 |

(Continued)

FOREIGN PATENT DOCUMENTS

DE    10 2005 040 543 A1    3/2007

(Continued)

OTHER PUBLICATIONS

European Patent Office extended European search report on application No. 10154663.8 dated Aug. 30, 2010; 7 pages.

(Continued)

*Primary Examiner* — Adolf Berhane
*Assistant Examiner* — Jeffrey Gblende
(74) *Attorney, Agent, or Firm* — Foley & Lardner LLP

(57) ABSTRACT

A first chopper circuit generates a first sequence of square wave voltages having a voltage level that changes to a positive side by chopping a direct current voltage at a system frequency. A second chopper circuit generates a second sequence of square wave voltages having a voltage level that changes to a negative side by chopping a direct current voltage at a frequency twice as high as the system frequency. The second chopper circuit further generates a third sequence of square wave voltages having a voltage level that changes to the positive and negative side in turns in the manner of sinusoidal wave by summing the first sequence of square wave voltages and the second sequence of square wave voltages. A third chopper circuit chops the third sequence of square wave voltages at a frequency determined by a timing that depends on if a voltage difference thereof to a sinusoidal wave voltage results in a positive value or a negative value and outputting the chopped third sequence of square wave voltages as a charge/discharge output. The third chopper circuit PWM-controls the charge/discharge output at a PWM frequency so that the difference is corrected to thereby generate a sinusoidal wave voltage that continuously changes to the positive and negative sides.

8 Claims, 16 Drawing Sheets

U.S. PATENT DOCUMENTS

| | | | |
|---|---|---|---|
| 2008/0101101 A1* | 5/2008 | Iwata et al. | 363/71 |
| 2008/0232145 A1 | 9/2008 | Hiller et al. | |
| 2011/0128763 A1 | 6/2011 | Iwata et al. | |
| 2011/0278935 A1* | 11/2011 | Gurunathan et al. | 307/77 |

FOREIGN PATENT DOCUMENTS

| | | |
|---|---|---|
| JP | 2002-010496 A | 1/2002 |
| JP | 2009-027806 | 2/2009 |
| JP | 2009-165222 | 7/2009 |
| WO | WO 02/063758 A1 | 8/2002 |
| WO | WO 2008/102552 A1 | 8/2008 |

OTHER PUBLICATIONS

Calais, Martina et al.; Multilevel Converters for Single-phase Grid Connected Photovoltaic Systems: An Overview; Solar Energy vol. 66, No. 5, Aug. 1, 1999; p. 325.

* cited by examiner

F I G. 1 3
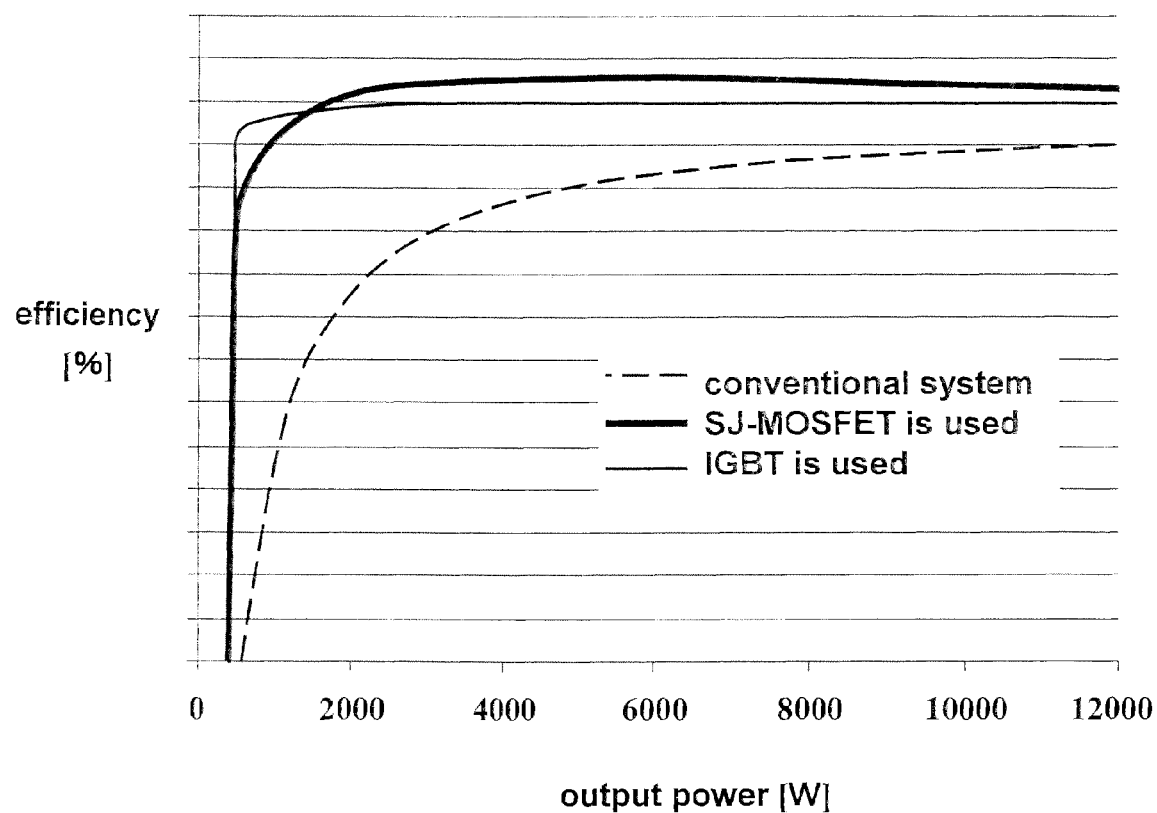

F I G. 1 7
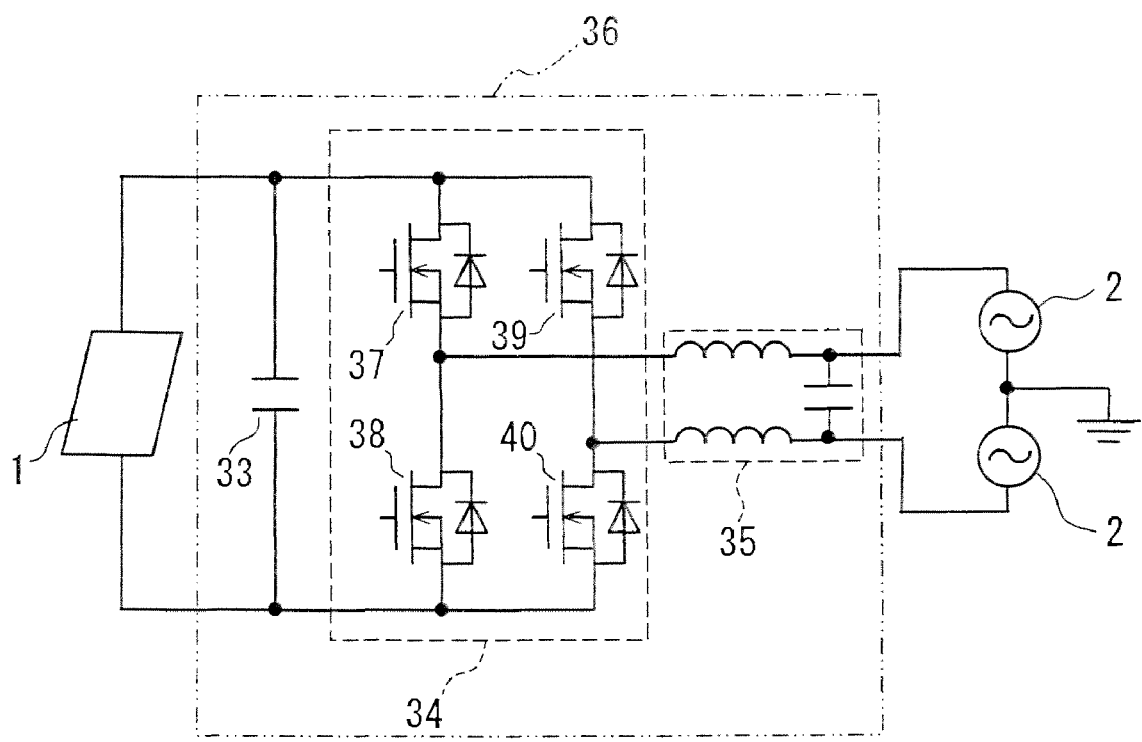

POWER CONVERSION APPARATUS, POWER CONDITIONER, AND POWER GENERATION SYSTEM

CROSS-REFERENCE TO RELATED APPLICATION

This application claims the benefit and priority of Japanese Patent Application No. 2009-061915 filed Mar. 13, 2009. The foregoing application is incorporated by reference herein in its entirety.

BACKGROUND OF THE INVENTION

1. Field of the Invention

The present invention relates to a chopper power conversion apparatus for chopping a direct current power and thereby converting the direct current power into an alternating current power, a power conditioner using the power conversion apparatus, and a power generation system using the power conversion apparatus, more particularly to a power conversion apparatus suitable for converting a direct current power generated by direct current power sources such as a solar cell and a fuel cell into an alternating current power for utility interconnection, a power conditioner used in the power conversion apparatus, and a power generation system.

2. Description of the Related Art

In perspective of global environment protection, there are proactively ongoing projects in recent years for developing a power generation system using, for example, a solar cell and a fuel cell expected to be least disruptive to the environment. In an example of the power generation system, a direct current power generated by a direct current power source, such as a solar cell, is converted by a power conditioner into an alternating current power having a commercial frequency for utility interconnection so that the converted alternating current power is supplied to a household load connected to a commercial power system, and surplus power, if the power generated by the power source exceeds power consumption by the household load, is returned to the system as a reverse power flow.

The power conditioner used in the power generation system conventionally includes an inverter for converting the direct current power generated by the solar cell into the alternating current, and a protection device for utility interconnection. There are two types of devices as such a power conditioner; an insulator device wherein a direct current unit and an alternating current unit are electrically insulated from each other by an insulation transformer, and a non-insulator device wherein the insulation transformer is not used. Comparing these two different devices, the latter non-insulator device, which is more advantageous in its power conversion efficiency, is more often used. An example of the latter device is recited in Japanese Patent Cited Document 1 (Unexamined Japanese Patent Publication No. 2002-10496).

FIG. 17 illustrates an example of a solar photovoltaic power generation system provided with a non-insulator power conditioner. A power conditioner 36 illustrated in the drawing is operable for utility interconnection with a commercial power source 2. The power conditioner 36 is provided with a smoothing capacitor 33 for smoothing power generated by and outputted from a solar photovoltaic panel 1, an inverter 34 for PWM control, a filter 35 having a reactor and a capacitor, and a control circuit not shown.

In the power conditioner 36, the generated power outputted from the solar photovoltaic panel 1 is smoothed by the smoothing capacitor 33. The inverter 34 has switching elements 37-40, which are, for example, four MOSFET where diodes are connected in reverse parallel to each other. The power conditioner 36 controls a switching operation of the switching elements 37-40 in the inverter 34 (the switching elements are switched on and off) at such a high frequency as around 18 kHz to thereby convert the generated power of the solar photovoltaic panel 1 smoothed by the smoothing capacitor 33 into an alternating current power synchronizing with a commercial power system and outputs the converted power. The power conditioner 36 supplies the alternating current power thus converted by way of the filter 35 to a load not shown or supplies it to the system as a reverse power flow.

The PWM-control inverter 34 provided in the power conditioner 36 is required to convert such a high direct current power as about 800 V supplied from the solar photovoltaic panel 1 into an alternating current power by switching on and off the switching elements 37-40 at the high frequency, around 18 kHz. Because of the technical feature, any power conversion apparatus provided in the conventional power conditioner 36 inevitably undergoes a large switching loss resulting from the power conversion in the power conditioner 36, resulting in a poor power conversion efficiency.

SUMMARY OF THE INVENTION

The present invention was carried out to solve the conventional problem, and a main object thereof is to provide a power conversion apparatus capable of more efficiently converting a direct current power into an alternating current power, a power conditioner using the power conversion apparatus, and a power generation system using the power conversion apparatus.

1) A power conversion apparatus according to the present invention comprises:

a square wave voltage generator for chopping a direct current voltage and thereby generating a sequence of square wave voltages including a plurality of square wave voltages having a voltage level that changes to positive and negative sides in turns in the manner of sinusoidal wave relative to a reference potential, the square wave voltage generator further outputting the generated sequence of square wave voltages as a charge/discharge output by a timing that depends on if a voltage difference thereof to a sinusoidal wave voltage results in a positive value or a negative value; and a sinusoidal wave voltage generator for PWM-controlling the charge/discharge output at a PWM frequency higher than a frequency used in the chopping so that the voltage difference between the sequence of square wave voltages and the sinusoidal wave voltage is corrected and gaining the sinusoidal wave voltage that continuously changes to the positive and negative sides relative to the reference potential using the sequence of square wave voltages and the PWM-controlled output.

A value of the reference potential is preferably zero. The square wave does not necessarily have perfect rising and falling waveforms and may include more or less bluntness in the rising and falling waveforms. It is meant by "changes to positive and negative sides in turns in the manner of sinusoidal wave" that the square wave voltage on the positive side (one side) and the square wave voltage on the negative side (the other side) relative to the reference potential are alternately generated at given periodic intervals. Preferably, the square wave and sinusoidal wave appear at equal periodic intervals. The sinusoidal wave voltage used to obtain the voltage difference to the sequence of square wave voltages is preferably a target sinusoidal wave voltage for the power conversion, more precise, a target value of the sinusoidal wave voltage (command value) is preferably used.

In the power conversion apparatus according to the present invention, the square wave voltage generator chops the direct current voltage and thereby generates the sequence of square wave voltages that changes to positive and negative sides in turns. Accordingly, the chopping frequency for generating the sequence of square wave voltages, in other words, the switching frequency of the switching element, can be favorably far below that of a conventional PWM-control inverter for generating a sequence of square wave voltages including a large number of square wave voltages in a positive or negative half cycle of the sinusoidal wave. As a result, possible switching loss can be lessened, and an element with less conduction loss can be selected as the switching element.

Further, the sinusoidal wave voltage generator, which PWM-controls the voltage difference between the sinusoidal wave voltage and the sequence of square wave voltages that changes to positive and negative sides in turns. Accordingly, the voltage used in the switching operation is lower than that of the conventional PWM-control inverter. The present invention, therefore, can reduce the switching loss.

According to the technical advantages described so far, the power conversion apparatus according to the present invention can improve its power conversion efficiency as compared with the conventional inverter.

2) A power conversion apparatus according to the present invention comprises:

a first square wave voltage generator for chopping a direct current voltage at a first frequency and thereby generating a first sequence of square wave voltages including a plurality of square wave voltages having a voltage level that changes to a positive side relative to a first reference potential;

a second square wave voltage generator for using a potential of the first sequence of square wave voltages as a second reference potential, the second square wave voltage generator chopping an output of the first square wave voltage generator at a second frequency higher than the first frequency and thereby generating a second sequence of square wave voltages including a plurality of square wave voltages having a voltage level lower than the voltage level of the first sequence of square wave voltages on the positive side that changes to a negative side relative to the second reference potential, the second square wave voltage generator further summing the first and second sequences of square wave voltages and thereby generating a third sequence of square wave voltages including a plurality of square wave voltages having a voltage level that changes to the positive and negative sides in turns in the manner of sinusoidal wave relative to the first reference potential;

a third square wave voltage generator for chopping the third sequence of square wave voltages at a third frequency determined by a timing that depends on if a voltage difference thereof to a sinusoidal wave voltage results in a positive value or a negative value and outputting the chopped third sequence of square wave voltages as a charge/discharge output; and a sinusoidal wave voltage generator for PWM-controlling the charge/discharge output of the third square wave voltage generator at a PWM frequency higher than the third frequency so that the voltage difference between the third sequence of square wave voltages and the sinusoidal wave voltage is corrected and gaining the sinusoidal wave voltage that continuously changes to the positive and negative sides relative to the first reference potential using the third sequence of square wave voltages and the PWM-controlled output.

In the power conversion apparatus according to the present invention, the first square wave voltage generator, second square wave voltage generator and third square wave voltage generator are used to generate the third sequence of square wave voltages that changes to the positive and negative sides in turns in the manner of sinusoidal wave and also generate the charge/discharge output depending on if the voltage difference between the third sequence of square wave voltages and the sinusoidal wave voltage results in a positive value or a negative value.

Accordingly, the chopping frequencies of the first square wave voltage generator, second square wave voltage generator and third square wave voltage generator, in other words, the switching frequencies of the switching elements, are favorably far below that of the conventional PWM-control inverter for generating a sequence of square wave voltages including a large number of square wave voltages in a positive or negative half cycle of the sinusoidal wave.

The present invention, therefore, can reduce number of times when the switching elements are manipulated and select elements with less conduction loss regardless of any increase of the switching loss in the switching elements. Another advantage is that the switching operation requires the voltage lower than that of the conventional PWM-control inverter because the sinusoidal wave voltage generator PWM-controls the voltage difference between the sinusoidal wave voltage and the sequence of square wave voltages that changes to positive and negative sides in turns. This technical advantage of the present invention also contributes to the reduction of the switching loss.

As is known from the description so far, the present invention can improve the power conversion efficiency as compared with the conventional inverter.

3) In the power conversion apparatus according to a preferred mode of the present invention, the first square wave voltage generator includes a first switching circuit having first and second two switching elements connected in series to each other, the first switching circuit is connected in parallel to a first capacitor connected to between positive and negative electrodes of a direct current power source, the first and second switching elements are switched on and off in turns at the first frequency, the second square wave voltage generator includes a parallel connection circuit having a second capacitor and a second switching circuit, one parallel connection side of the parallel connection circuit is connected to a connecting portion where the first and second switching elements are serially connected to each other, the second switching circuit has third and fourth two switching elements connected in series to each other, the third and fourth switching elements are switched on and off in turns at the second frequency, the third square wave voltage generator includes a parallel connection circuit having a third capacitor and a third switching circuit, the third switching circuit has fifth and sixth two switching elements connected in series to each other, a connecting portion where the fifth and sixth switching elements are serially connected to each other is connected to a connecting portion where the third and fourth switching elements are serially connected to each other, the fifth and sixth switching elements are switched on and off in turns at the third frequency, the sinusoidal wave voltage generator includes a fourth switching circuit connected in parallel to the parallel connection circuit of the third square wave voltage generator, the fourth switching circuit has seventh and eighth two switching elements connected in series to each other, and the seventh and eighth switching elements are PWM-controlled at the PWM frequency higher than the third frequency.

According to the preferred mode, the first square wave voltage generator generates the first sequence of square wave voltages that changes to the positive side at the first frequency. The second square wave voltage generator generates the second sequence of square wave voltages that changes to the negative side at the second frequency higher than the first frequency, and further generates the third sequence of square wave voltages that changes to the positive and negative sides in turns in the manner of sinusoidal wave by summing the first and second sequences of square wave voltages. The third square wave voltage generator generates the charge/discharge output at the third frequency determined by the timing that depends on if the voltage difference between the third sequence of square wave voltages and the sinusoidal wave voltage results in a positive value or a negative value.

Accordingly, the first-third frequencies, which are the chopping frequencies of the first square wave voltage generator, second square wave voltage generator and third square wave voltage generator, can be favorably far below that of the conventional PWM-control inverter for generating a sequence of square wave voltages including a large number of square wave voltages in a positive or negative half cycle of the sinusoidal wave.

The sinusoidal wave voltage generator PWM-controls the voltage difference between the sinusoidal wave voltage and the third sequence of square wave voltages. Therefore, the switching operation can be performed by the voltage lower than that of the conventional PWM-control inverter.

4) In the power conversion apparatus according to another preferred mode of the present invention, the first frequency is 50 Hz or 60 Hz equal to a system frequency of a commercial power source, and the second frequency is a frequency twice as high as the first frequency. The third frequency determined by the timing that depends on if the voltage difference between the third sequence of square wave voltages and the sinusoidal wave voltage results in a positive value or a negative value is a frequency substantially three times as high as the first frequency.

According to the another preferred mode, therefore, the chopping frequencies of the first square wave voltage generator, second square wave voltage generator and third square wave voltage generator are respectively, for example, 50 Hz, 100 Hz and 150 Hz, which are favorably far below that of the conventional PWM-control converter, about 18 kHz.

5) A power conditioner according to the present invention is a power conditioner for converting a direct current power outputted from a direct current power source into an alternating current power for utility interconnection with a commercial power source, comprising:

a square wave voltage generator for chopping the direct current voltage from the direct power source at a frequency relevant to a system frequency and thereby generating a sequence of square wave voltages including a plurality of square wave voltages having a voltage level that changes to positive and negative sides in turns in the manner of sinusoidal wave relative to a reference potential, the square wave voltage generator further outputting the generated sequence of square wave voltages as a charge/discharge output by a timing that depends on if a voltage difference thereof to a sinusoidal wave voltage results in a positive value or a negative value; and a sinusoidal wave voltage generator for PWM-controlling the charge/discharge output at a PWM frequency higher than the chopping frequency so that the voltage difference between the sequence of square wave voltages and the sinusoidal wave voltage is corrected and gaining the sinusoidal wave voltage that continuously changes to the positive and negative sides relative to the reference potential using the sequence of square wave voltages and the PWM-controlled output, the sinusoidal wave voltage generator further outputting the sinusoidal wave voltage to a load.

The direct current power source denotes a power source for generating a direct current power such as a solar cell, fuel battery or wind power generator. The frequency relevant to the system frequency denotes a frequency determined based on the system frequency, an example of which is a frequency, a predetermined number of times of the system frequency.

In the power conditioner according to the present invention, the square wave voltage generator chops the direct current voltage to thereby generate the sequence of square wave voltages that changes to the positive and negative sides in turns in the manner of sinusoidal wave. As a result, the chopping frequency for generating the sequence of square wave voltages, which is the switching frequency of the switching element, is favorably far below that of the conventional PWM-control inverter for generating a sequence of square wave voltages including a large number of square wave voltages in a positive or negative half cycle of the sinusoidal wave.

According to the present invention, therefore, the switching loss can be lessened, and an element with less conduction loss can be selected as the switching element. In the present invention further characterized in PWM-controlling the voltage difference between the sinusoidal wave voltage and the sequence of square wave voltages that changes to the positive and negative sides in turns, the voltage used in the switching operation is lower that of the conventional PWM-control inverter. As a result, the present invention enables the reduction of the switching loss.

As is known from the description so far, the power conditioner according to the present invention can improve the power conversion efficiency as compared with the conventional power conditioner.

6) A power conditioner according to the present invention is a power conditioner for converting a direct current power outputted from a direct current power source into an alternating current power for utility interconnection with a commercial power source, comprising:

a first square wave voltage generator for chopping the direct current voltage from the direct power source at a first frequency equal to a system frequency and thereby generating a first sequence of square wave voltages including a plurality of square wave voltages having a voltage level that changes to a positive side relative to a first reference potential;

a second square wave voltage generator for using a potential of the first sequence of square wave voltages as a second reference potential, the second square wave voltage generator chopping an output of the first square wave voltage generator at a second frequency a predetermined number of times as high as the first frequency and thereby generating a second sequence of square wave voltages including a plurality of square wave voltages having a voltage level lower than the voltage level of the first sequence of square wave voltages on the positive side that changes to a negative side relative to the second reference potential, the second square wave voltage generator further generating a third sequence of square wave voltages including a plurality of square wave voltages having a voltage level that changes to positive and negative sides in turns in the manner of sinusoidal wave relative to the first reference potential by summing the first and second sequences of square wave voltages;

a third square wave voltage generator for chopping the third sequence of square wave voltages at a third frequency determined by a timing that depends on if a voltage difference thereof to an output command results in a positive value or a negative value and outputting the chopped third sequence of square wave voltages as a charge/discharge output; and a sinusoidal wave voltage generator for PWM-controlling the charge/discharge output of the third square wave voltage generator at a PWM frequency higher than the third frequency so that the voltage difference between the sequence of square wave voltages and the sinusoidal wave voltage is corrected and gaining the sinusoidal wave voltage that continuously changes to the positive and negative sides relative to the first reference potential using the third sequence of square wave voltages and the PWM-controlled output, the sinusoidal wave voltage generator further outputting the sinusoidal wave voltage to a load.

In the power conversion apparatus according to the present invention, the first square wave voltage generator, second square wave voltage generator and third square wave voltage generator are used to generate the third sequence of square wave voltages that changes to the positive and negative sides in turns in the manner of sinusoidal wave and also generate the charge/discharge output that depends on if the voltage difference between the third sequence of square wave voltages and the sinusoidal wave voltage results in a positive value or a negative value.

Accordingly, the chopping frequencies of the first square wave voltage generator, second square wave voltage generator and third square wave voltage generator, in other words, the switching frequencies of the switching elements, are favorably far below that of the conventional PWM-control inverter for generating a sequence of square wave voltages including a large number of square wave voltages in a positive or negative half cycle of the sinusoidal wave.

Accordingly, the switching loss can be lessened, and elements with less conduction loss can be selected as the switching elements in the present invention. The present invention is further characterized in that the sinusoidal wave voltage generator PWM-controls the voltage difference between the sinusoidal wave voltage and the sequence of square wave voltages that changes to the positive and negative sides in turns. The technical advantage can lower the voltage in the switching operation as compared with that of the conventional PWM-control inverter. As a result, the present invention enables the reduction of the switching loss.

The power conditioner according to the present invention, therefore, can improve the power conversion efficiency as compared with the conventional power conditioner.

7) In the power conditioner according to a preferred mode of the present invention, the first square wave voltage generator includes a first switching circuit having first and second two switching elements connected in series to each other, the first switching circuit is connected in parallel to a first capacitor connected to between positive and negative electrodes of a direct current power source, the first and second switching elements are switched on and off in turns at the first frequency, the second square wave voltage generator includes a parallel connection circuit having a second capacitor and a second switching circuit, one parallel connection side of the parallel connection circuit is connected to a connecting portion where the first and second switching elements are serially connected to each other, the second switching circuit has third and fourth two switching elements connected in series to each other, the third and fourth switching elements are switched on and off in turns at the second frequency, the third square wave voltage generator includes a parallel connection circuit having a third capacitor and a third switching circuit, the third switching circuit has fifth and sixth two switching elements connected in series to each other, a connecting portion where the fifth and sixth switching elements are serially connected to each other is connected to a connecting portion where the third and fourth switching elements are serially connected to each other, the fifth and sixth switching elements are switched on and off in turns at the third frequency, the sinusoidal wave voltage generator includes a fourth switching circuit connected in parallel to the parallel connection circuit of the third square wave voltage generator, the fourth switching circuit has seventh and eighth two switching elements connected in series to each other, and the seventh and eighth switching elements are PWM-controlled at the PWM frequency higher than the third frequency.

According to the preferred mode, the first square wave voltage generator generates the first sequence of square wave voltages that changes to the positive side at the first frequency. The second square wave voltage generator generates the second sequence of square wave voltages that changes to the negative side at the second frequency higher than the first frequency, and further generates the third sequence of square wave voltages that changes to the positive and negative sides in turns in the manner of sinusoidal wave by summing the first and second sequences of square wave voltages. The third square wave voltage generator generates the charge/discharge output at the third frequency that depends on if the voltage difference between the third sequence of square wave voltages and the sinusoidal wave voltage results in a positive value or a negative value.

Accordingly, the first-third frequencies, which are the chopping frequencies of the first square wave voltage generator, second square wave voltage generator and third square wave voltage generator, can be favorably far below that of the conventional PWM-control inverter for generating a sequence of square wave voltages including a large number of square wave voltages in a positive or negative half cycle of the sinusoidal wave.

The sinusoidal wave voltage generator PWM-controls the voltage difference between the sinusoidal wave voltage and the third sequence of square wave voltages. Therefore, the switching operation can be performed by the voltage lower than that of the conventional PWM-control inverter.

8) In the power conditioner according to another preferred mode of the present invention, the first frequency is 50 Hz or 60 Hz, and the second frequency is a frequency twice as high as the first frequency. The third frequency is three times as high as the first frequency based on a reason similar to 4).

According to the another preferred mode, therefore, the firth-third frequencies, which are the chopping frequencies of the first square wave voltage generator, second square wave voltage generator and third square wave voltage generator, are respectively, for example, 50 Hz, 100 Hz and 150 Hz. Thus, the chopping frequencies are favorably far below that of the conventional PWM-control converter, about 18 kHz.

9) A power generation system according to the present invention comprises:

a direct current power source; and a power conditioner connected to the direct current power source, wherein the power generation system converts a direct current power generated by the direct current power source into an alternating current power using the power conditioner for utility interconnection with a commercial power source, and the power conditioner comprises:

a square wave voltage generator for chopping the direct current voltage from the direct current power source at a frequency relevant to a system frequency and thereby generating a sequence of square wave voltages including a plurality of square wave voltages having a voltage level that changes to positive and negative sides in turns in the manner of sinusoidal wave relative to a reference potential, the square wave voltage generator further outputting the sequence of square wave voltages as a charge/discharge output by a timing that depends on if a voltage difference thereof to a sinusoidal wave voltage results in a positive value or a negative value; and a sinusoidal wave voltage generator for PWM-controlling the charge/discharge output at a PWM frequency higher than the chopping frequency so that the voltage difference between the sequence of square wave voltages and the sinusoidal wave voltage is corrected and gaining the sinusoidal wave voltage that continuously changes to the positive and negative sides relative to the reference potential using the sequence of square wave voltages and the PWM-controlled output, the sinusoidal wave voltage generator further outputting the sinusoidal wave voltage to a load.

The power generation system according to the present invention, therefore, can improve the power conversion efficiency of the power conditioner as compared with the conventional power conditioner. As a result, the power generation system per se can increase its power efficiency.

10) A power generation system according to the present invention comprises:

a direct current power source; and a power conditioner connected to the direct current power source, wherein the power generation system converts a direct current power generated by the direct current power source into an alternating current power using the power conditioner for utility interconnection with a commercial power source, and the power conditioner comprises:

a first square wave voltage generator for chopping the direct current voltage from the direct power source at a first frequency relevant to a system frequency and thereby generating a first sequence of square wave voltages including a plurality of square wave voltages having a voltage level that changes to a positive side relative to the first reference potential;

a second square wave voltage generator for using a potential of the first sequence of square wave voltages as a second reference potential, the second square wave voltage generator chopping an output of the first square wave voltage generator at a second frequency a predetermined number of times as high as the first frequency and thereby generating a second sequence of square wave voltages including a plurality of square wave voltages having a voltage level lower than the voltage level of the first sequence of square wave voltages that changes to a negative side relative to the second reference potential on the positive side, the second square wave voltage generator further generating a third sequence of square wave voltages including a plurality of square wave voltages having a voltage level that changes to the positive and negative sides in turns in the manner of sinusoidal wave relative to the first reference potential by summing the first and second sequences of square wave voltages;

a third square wave voltage generator for chopping the third sequence of square wave voltages at a third frequency determined by a timing that depends on if a voltage difference thereof to a sinusoidal wave voltage results in a positive value or a negative value and outputting the chopped third sequence of square wave voltages as a charge/discharge output; and a sinusoidal wave voltage generator for PWM-controlling the charge/discharge output of the third square wave voltage generator at a PWM frequency higher than the third frequency so that the voltage difference between the sequence of square wave voltages and the sinusoidal wave voltage is corrected and gaining the sinusoidal wave voltage that continuously changes to the positive and negative sides relative to the first reference potential using the third sequence of square wave voltages and the PWM-controlled output, the sinusoidal wave voltage generator further outputting the sinusoidal wave voltage to a load.

The power generation system according to the present invention, therefore, can improve the power conversion efficiency of the power conditioner as compared with the conventional power conditioner. As a result, the power generation system per se can increase its power efficiency.

According to the present invention, the direct current voltage is chopped to generate the sequence of square wave voltages that changes to the positive and negative side in turns in the manner of sinusoidal wave. The chopping frequencies for generating the sequence of square wave voltages, in other words, the switching frequencies of the switching elements, can be favorably far below the switching frequency in the conventional PWM-control inverter for generating a sequence of square wave voltages including a large number of square wave voltages in a positive or negative half cycle of the sinusoidal wave.

As a result, the switching loss can be lessened, and elements with less conduction loss can be selected as the switching elements. The present invention is further characterized in PWM-controlling the voltage difference between the sinusoidal wave voltage and the sequence of square wave voltages that changes to positive and negative sides in turns. Accordingly, the present invention can lower the voltage in the switching operation than in the conventional PWM-control inverter. This technical advantage of the present invention also contributes to the reduction of the switching loss. As described so far, the present invention can accomplish remarkable improvements in the power conversion efficiency as compared with the conventional examples, and can be advantageously applied to the power conversion apparatus.

BRIEF DESCRIPTION OF THE DRAWINGS

These and other objects as well as advantages of the invention will become clear by the following description of preferred embodiments of the invention. A number of benefits not recited in this specification will come to the attention of the skilled in the art upon the implementation of the present invention.

FIG. 13 is a graph illustrating characteristics according to the preferred embodiment and characteristics of a conventional system.

FIG. 17 is a drawing illustrating a conventional example.

DETAILED DESCRIPTION OF THE INVENTION

Preferred Embodiment 1

Figure 1:
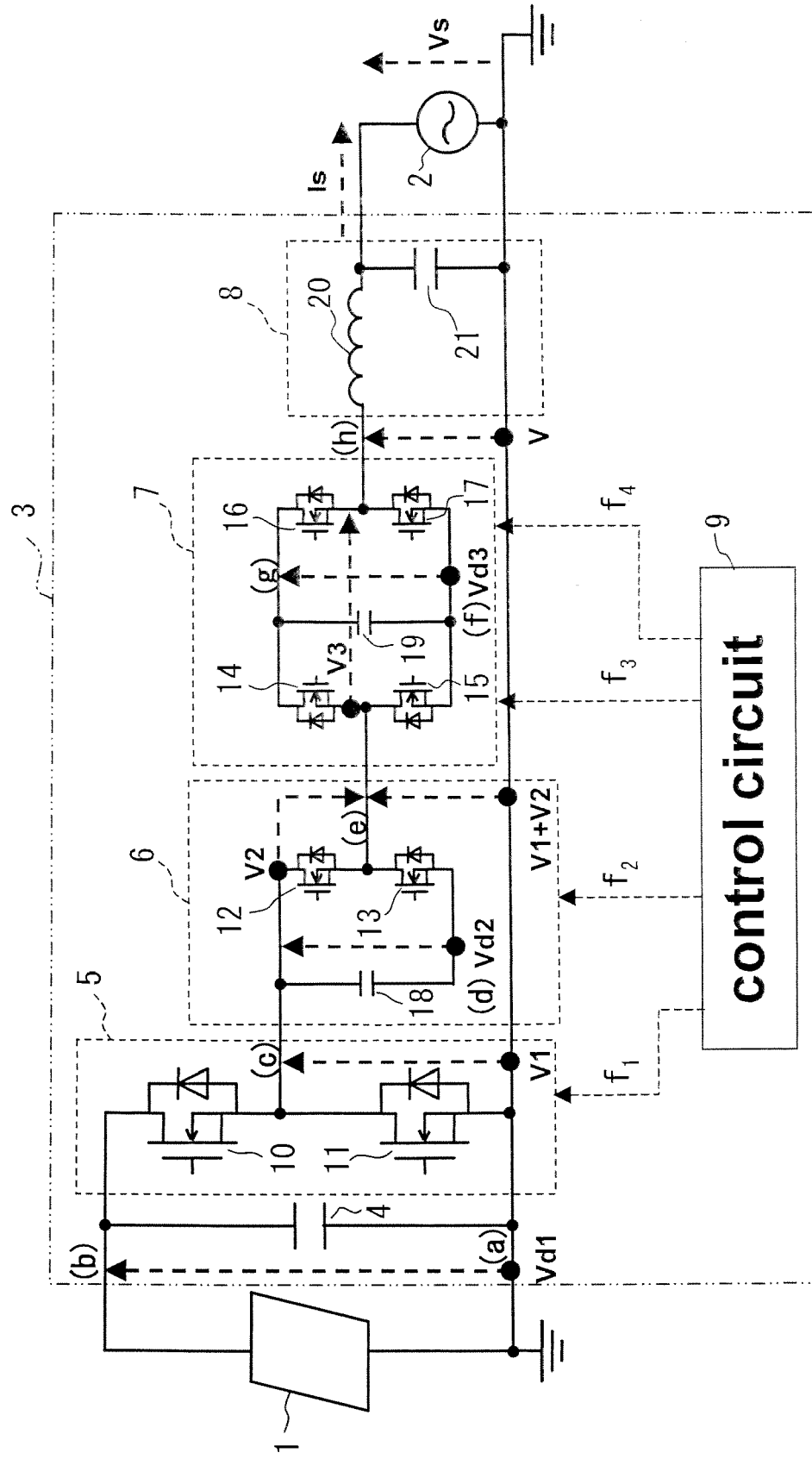
FIG. 1 is a drawing illustrating a solar photovoltaic power generation system according to a preferred embodiment of the present invention.

FIG. 1 is an illustration of a solar photovoltaic power generation system of a single-phase two-wire structure according to a preferred embodiment of the present invention. The solar photovoltaic power generation system according to the present preferred embodiment is provided with a solar photovoltaic panel 1, and a power conditioner 3, operable for utility interconnection with a commercial power source 2, for converting a direct current power from the solar photovoltaic panel 1 into an alternating current power.

The solar photovoltaic panel 1 has a plurality of solar photovoltaic modules connected in series or in parallel to each other so that a required power is generated. Very thin solar cells made of amorphous silicon constitute the solar photovoltaic panel 1 according to the present preferred embodiment. The power conditioner 3 according to the present preferred embodiment is a non-insulator power conditioner not provided with an insulation transformer. The power conditioner 3 comprises a first capacitor 4 serving as a smoothing capacitor, first-third chopper circuits 5-7, a noise filter 8, and a control circuit 9 for controlling the chopper circuits 5-7 by measuring voltages of the respective structural elements. The first-third chopper circuits 5-7 and the control circuit 9 constitute a chopper converter cascade-connected to the solar photovoltaic panel 1. A negative-electrode side of the solar photovoltaic panel 1 is grounded. A point a illustrated in FIG. 1 denotes a ground, and a voltage at the ground is zero. A point b denotes a positive-electrode side of the solar photovoltaic panel 1. The first capacitor 4 is connected in parallel to between the positive and negative electrodes of the solar photovoltaic panel 1.

The first chopper circuit 5 is connected in parallel to the first capacitor 4. The first chopper circuit 5 includes first and second two switching elements 10 and 11 connected in series to each other, and diodes are connected in inverse parallel to the first and second switching elements 10 and 11. The first chopper circuit 5 including the first and second switching elements 10 and 11 constitutes a first switching circuit.

In the first chopper circuit 5, the first and second switching elements 10 and 11 are switched on and off in turns at a first frequency $f_1$ equal to a system frequency, for example, 50 Hz by a gate signal supplied from the control circuit 9. In a manner similar to switching elements 12-17 of the second and third chopper circuits 6 and 7, an N-channel MOSFET constitutes the respective first and second switching elements 10 and 11. The switching element is not necessarily limited to the MOSFET, and any of other switching elements, such as IGBT and transistor, may be used.

The second chopper circuit 6 includes a second capacitor 18 and a second switching circuit having serially connected third and fourth two switching elements 12 and 13 to which diodes are connected in reverse parallel. The second capacitor 18 and the second switching circuit are connected in parallel to each other. The third and fourth switching elements 12 and 13 are switched on and off in turns at a second frequency $f_2$ twice as high as the first frequency $f_1$, for example, 100 Hz, by a gate signal supplied from the control circuit 9.

One end side of the second chopper circuit 6 where the second capacitor 18 and the second switching circuit are connected in parallel is connected to a connecting portion where the first and second switching elements 10 and 11 are serially connected in the first chopper circuit 5. A point of the connection is shown with c. In the drawing, c and d are respectively on the sides of two capacitor electrodes of the second capacitor 18.

The third chopper circuit 7 includes a third switching circuit having serially connected fifth and sixth two switching elements 14 and 15 to which diodes are connected in reverse parallel, a third capacitor 19, and a fourth switching circuit having serially connected seventh and eighth two switching elements 16 and 17 to which diodes are connected in reverse parallel. In the third chopper circuit 7, the third switching circuit, third capacitor 19 and fourth switching circuit are connected in parallel to one another. One end side of the third chopper circuit 7 where these circuits are connected in parallel and the other end side thereof are shown with f and g in FIG. 1. f and g are respectively on the sides of two capacitor electrodes of the third capacitor 19.

The fifth and sixth switching elements 14 and 15 are switched on and off in turns at a third frequency $f_3$ three times as high as the first frequency $f_1$, for example, 150 Hz, by a gate signal supplied from the control circuit 9. The seventh and eighth switching elements 16 and 17 are PWM-controlled at a high frequency f4, for example, 18 kHz, by a gate signal supplied from the control circuit.

A connecting portion where the fifth and sixth switching elements 14 and 15 are serially connected in the third chopper circuit 7 is connected to a connecting portion where the third and fourth switching elements 12 and 13 are serially connected in the second chopper circuit 6. A point of the connection is shown with e in FIG. 1. The noise filter 8 including a reactor 20 and a fourth capacitor 21 is connected to a connecting portion where the seventh and eighth switching elements 16 and 17 are serially connected in the third chopper circuit 7. A point of the connection is shown with h in FIG. 1. A load not shown and the commercial power source 2 are connected to the noise filter 8.

The control circuit 9 measures a system voltage Vs and a system current Is by way of a differential amplifier circuit not shown and thereby calculates a command value V* as a sinusoidal target voltage synchronizing with the system frequency of the commercial power source 2 as in the conventional technology. The control circuit 9 further measures voltages Vd1, Vd2 and Vd3 at both ends of the first-third capacitors 4, 18 and 19 by way of the differential amplifier circuit not shown and thereby generates the gate signals for controlling the chopper circuits 5-7.

The voltage Vd1 is a direct current output voltage of the solar photovoltaic panel 1 detected at the point b with a voltage at the ground point a as a reference voltage. The voltage Vd2 is a charge voltage at one of the capacitor electrode points, c, of the second capacitor 18 of the second chopper circuit 6 with a voltage at the other capacitor electrode point d thereof as a reference voltage. The voltage Vd3 is a charge voltage at one of the capacitor electrode points, g, of the third capacitor 19 of the third chopper circuit 7 with a voltage at the other capacitor electrode point f thereof as a reference voltage.

Figure 2:
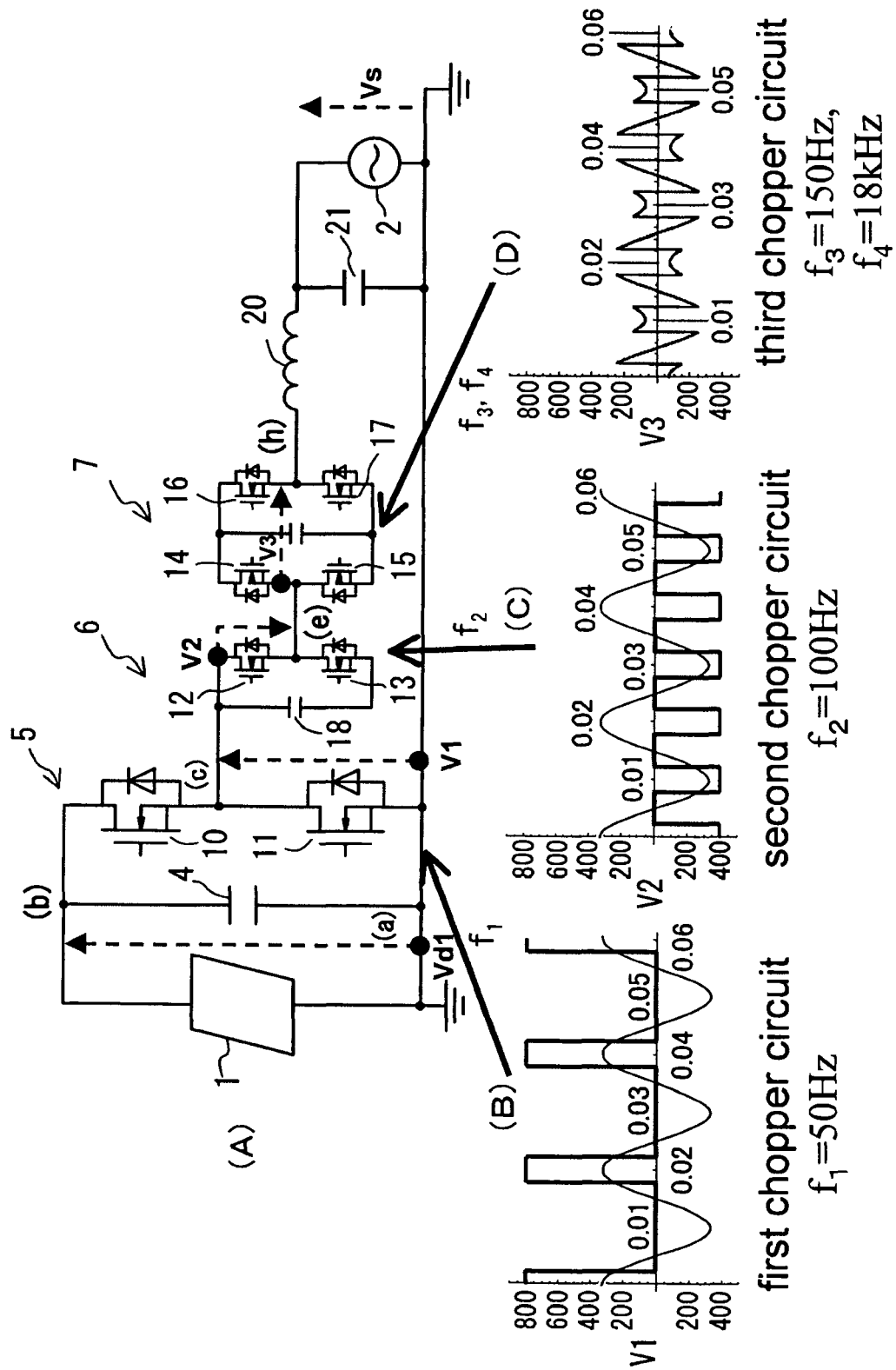
FIG. 2 is illustrations referred to in the description of a theory of operation of a power conditioner illustrated in FIG. 1.

FIG. 2 is drawings schematically illustrating operations of the chopper circuits 5-7 according to the present preferred embodiment. (A) in FIG. 2 is an illustration of principal structural elements of FIG. 1, and (B)-(D) in FIG. 2 respectively illustrate voltages V1, V2 and V3 in (A) in FIG. 2. In (B) and (C) in FIG. 2, a waveform of the command value V* as the sinusoidal targeted voltage synchronizing with the system frequency is shown a thin solid line.

The voltage V1 is a voltage at the point c that is the connecting portion where the first and second switching elements 10 and 11 are serially connected in the first chopper circuit 5 with a potential at the ground point a as a first reference potential. The voltage V2 is a voltage at the point e that is the connecting portion where the third and fourth switching elements 12 and 13 are serially connected in the second chopper circuit 6 with a potential at the point c as a second reference potential. The voltage V3 is a voltage at the point h that is the connecting portion where the seventh and eighth switching elements 16 and 17 are serially connected in the third chopper circuit 7, wherein a potential at the point e, that is the connecting portion where the fifth and sixth switching elements 14 and 15 of the third chopper circuit 7 are serially connected, is used as a reference potential.

In the case of 50 Hz equal to the system frequency of the commercial power source 2, the switching elements 10 and 11 in the first chopper circuit 5 are switched on and off in turns at the first frequency $f_1$, 50 Hz, equal to the system frequency. Accordingly, the voltage V1 at the point c, that is the connection portion where the first and second switching elements 10 and 11 are serially connected, results in a first sequence of square wave voltages including a plurality of square wave voltages that rises to the positive side as illustrated in (B) in FIG. 2. The square wave voltage level of the voltage V1 is equal to the direct current output voltage Vd1 of the solar photovoltaic panel 1.

In the second chopper circuit 6, the third and fourth switching elements 12 and 13 are switched on and off in turns at the second frequency $f_2$, 100 Hz, twice as high as the first frequency $f_1$. Accordingly, as illustrated in (C) in FIG. 2, the voltage V2 at the point e, that is the connecting portion where the third and fourth switching elements 12 and 13 are serially connected, results in a second sequence of square wave voltages including a plurality of square wave voltages that falls to the negative side with the point c where the first and second switching elements 10 and 11 are serially connected as a benchmark. The square wave voltage level of the voltage V2 is controlled to be ½ of the direct current output voltage $Vd_1$.

As illustrated in (D) in FIG. 4 described later, the voltage V2 at the point e, that is the connecting portion where the third and fourth switching elements 12 and 13 are serially connected in the second chopper circuit 6, is equal to the voltage V1+V2 (the sum of the voltage V1 in the points a-c and the voltage V2 in the points c-e) having a stepwise waveform that sinusoidally changes to the positive and negative sides in turns, in the case where the ground point a is used as a benchmark, in other words, the first referential potential is used as the reference potential. The voltage V1+V2 having the stepwise waveform changes to the positive and negative sides in turns in synchronization with the command value V* as the sinusoidal target value shown in (D) in FIG. 4 in a thin solid line.

In the third chopper circuit 7, the fifth and sixth switching elements 14 and 15 are switched on and off in turns at the third frequency $f_3$, 150 Hz, three times as high as the first frequency $f_1$ so that a voltage difference between the voltage V1+V2 having the stepwise waveform and the command value V* as the sinusoidal target voltage is compensated. The seventh and eighth switching elements 16 and 17 are PWM-controlled at the frequency $f_4$, 18 kHz.

As a result, as illustrated in (D) in FIG. 2, the voltage V3 at the point h, that is the connecting portion where the seventh and eighth switching elements 16 and 17 are serially connected in the third chopper circuit 7 in (A) in FIG. 2, is equal to the voltage difference between the voltage V1+V2 having the stepwise waveform and the command value V* as the sinusoidal target voltage if indicated as a PWM mean value based on the point e that is the connecting portion where the fifth and sixth switching elements 14 and 15 are serially connected as a benchmark.

Therefore, the voltage V3 at the point h, that is the connecting portion where the seventh and eighth switching elements 16 and 17 are serially connected in the third chopper circuit 7, is equal to a sinusoidal wave voltage in accord with the command value V* as the target voltage synchronizing with the commercial power source 2 in the case where the first reference potential at the ground point a is used as the reference potential.

Figure 3:
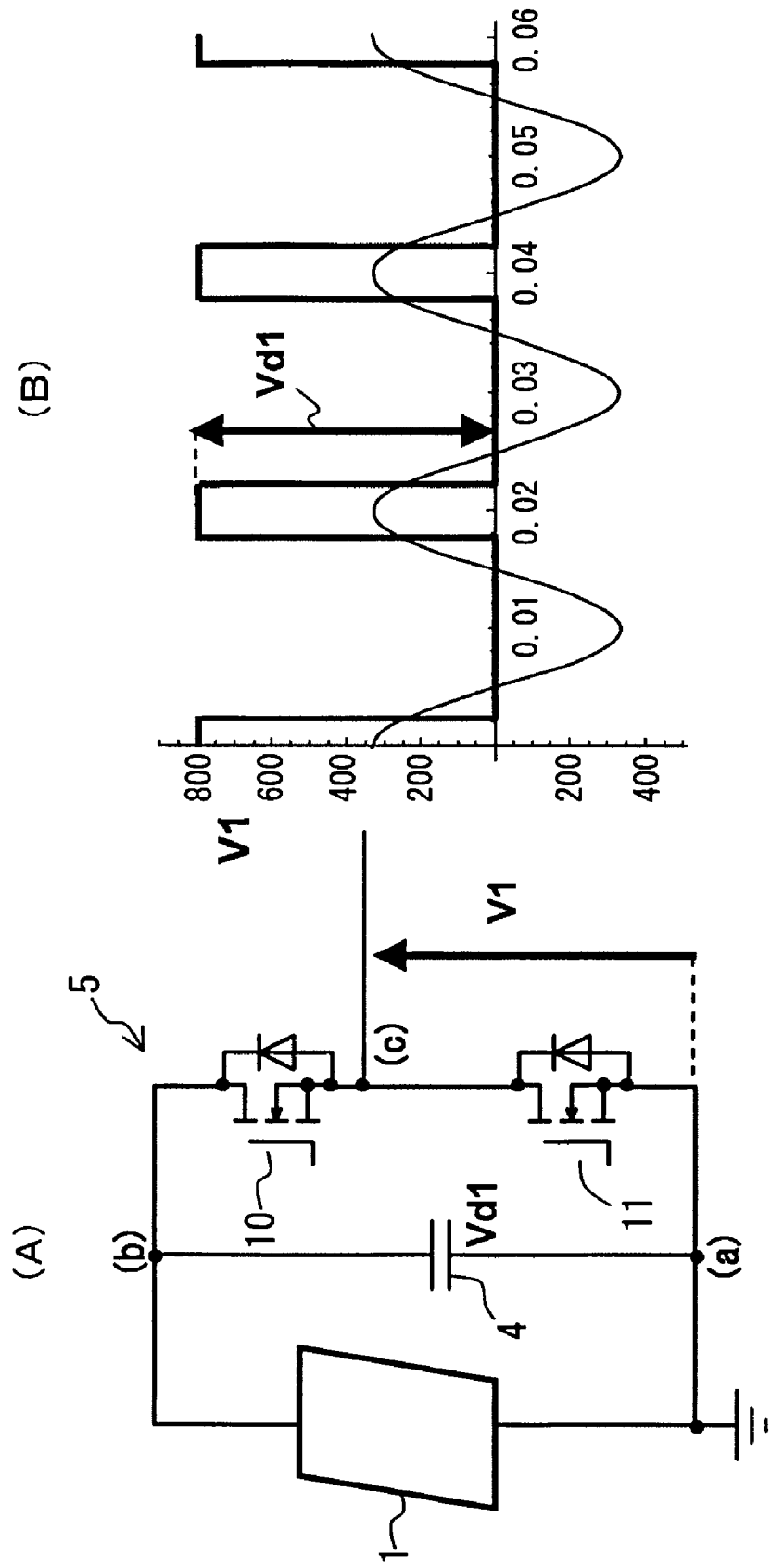
FIG. 3 is illustrations referred to in the description of a theory of operation of a first chopper circuit illustrated in FIG. 1.

The theory of the operation of each of the first-third chopper circuits 5-7 is described in further detail. FIG. 3 is drawings illustrating the theory of operation of the first chopper circuit 5. (A) in FIG. 3 illustrates the solar photovoltaic panel 1, first capacitor 4 and first chopper circuit 5. (B) in FIG. 3 illustrates the voltage V1 in the points a-c. In (B) in FIG. 3, the command value V* as the sinusoidal target voltage is shown in a thin solid line.

At the point b on the positive side of the solar photovoltaic panel 1 is detected the appearance of the direct current output voltage $Vd_1$ of the solar photovoltaic panel 1 smoothed by the first capacitor 4 with a potential at the ground point a as the first reference potential.

In the first chopper circuit 5, the direct current output voltage $Vd_1$ is chopped by the first and second switching elements 10 and 11 which are switched on and off in turns at the first frequency $f_1$, 50 Hz. When the first switching element 10 is switched on and the second switching element 11 is switched off, the charge voltage $Vd_1$ of the first capacitor 4, that is the voltage at the point b, appears at the point c that is the connecting portion where the first and second switching elements 10 and 11 are serially connected in the first chopper circuit 5.

When the first switching element 10 is switched off and the second switching element 11 is switched on, the ground voltage $Vd_1$ at the point a appears at the point c that is the connecting portion where the first and second switching elements 10 and 11 are serially connected in the first chopper circuit 5.

Therefore, as illustrated in (B) in FIG. 3, the voltage V1 at the point c, that is the connecting portion where the first and second switching elements 10 and 11 are serially connected, results in the first sequence of square wave voltages including a plurality of square wave voltages that rises to the positive side with the ground potential as the first reference potential as described earlier. The voltage V1 is a voltage at the point c that is the connecting portion where the first and second switching elements 10 and 11 are serially connected with the point a as a benchmark. The square wave voltage level is equal to the direct current output voltage $Vd_1$ of the solar photovoltaic panel 1, for example, 800 V.

The first chopper circuit 5, which generates the sequence of square wave voltages having a phase equal to that of the system voltage, can output an effective power.

Figure 4:
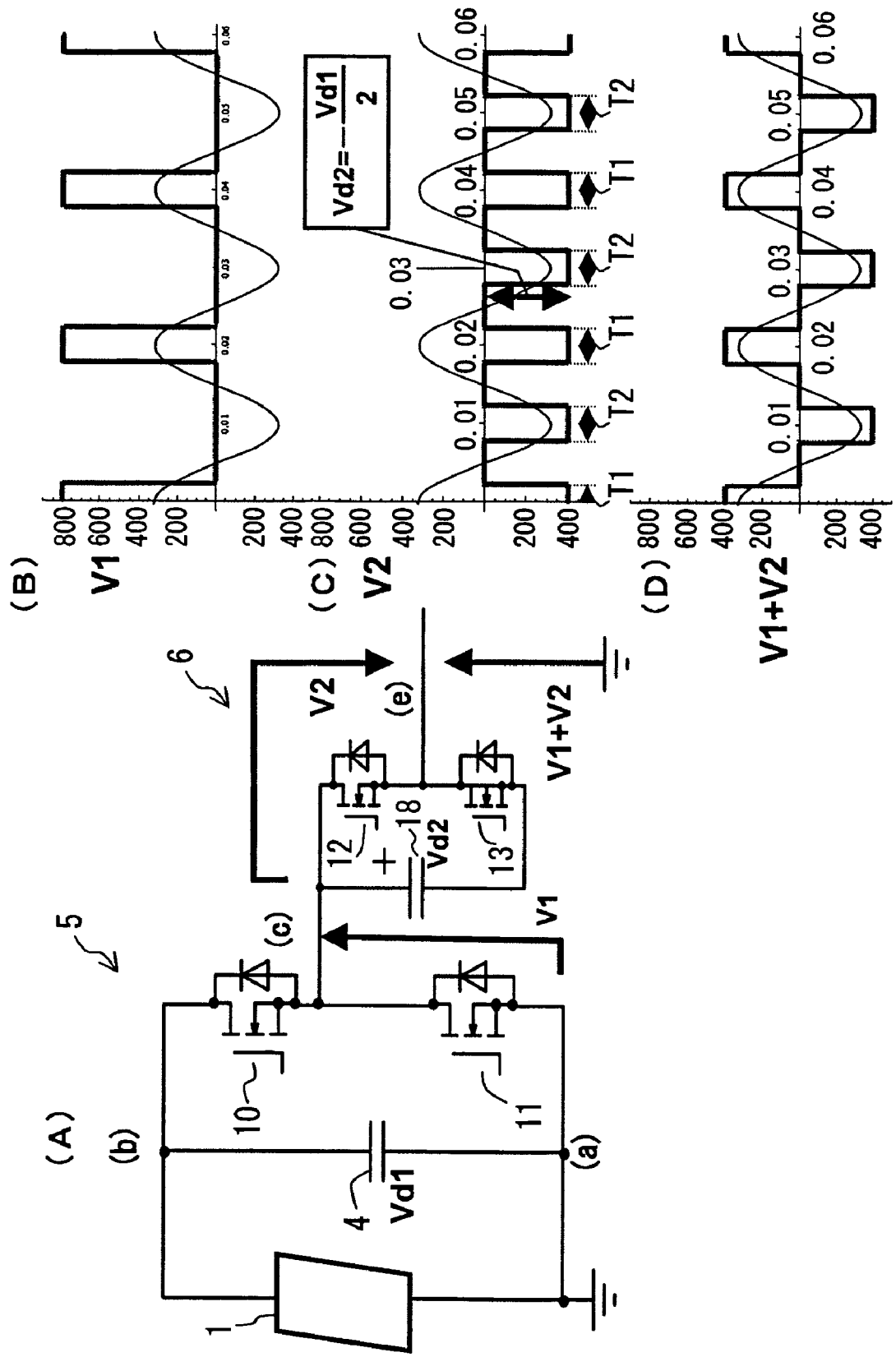
FIG. 4 is illustrations referred to in the description of a theory of operation of a second chopper circuit illustrated in FIG. 1.

FIG. 4 is a drawing referred to in the description of the theory of operation of the second chopper circuit 6. (A) in FIG. 4 illustrates the first chopper circuit 5 and the second chopper circuit 6, (B) in FIG. 4 illustrates the voltage V1, (C) in FIG. 4 illustrates the voltage V2, and (D) in FIG. 4 illustrates the voltage V1+V2. In (B)-(D) in FIG. 4, the command value V* as the sinusoidal target voltage is shown in a thin solid line.

In the second chopper circuit 6, the voltage V1 at the point c illustrated in (B) in FIG. 4 is chopped by the third and fourth switching elements 12 and 13 which are switched on and off in turns at the second frequency $f_2$, 100 Hz. When the third switching element 12 is switched on and the fourth switching element 13 is switched off, a potential at the point e, that is the connecting portion where the third and fourth switching elements 12 and 13 are serially connected, is equal to a potential at the point c that is the connecting portion where the first and second switching elements 10 and 11 are serially connected in the first chopper circuit 5. When the third switching element 12 is switched off and the fourth switching element 13 is switched on, the potential at the point e, that is the connecting portion where the third and fourth switching elements 12 and 13 are serially connected, is lower than the potential at the point c. Therefore, the voltage V2 at the point e, that is the connecting portion where the third and fourth switching elements 12 and 13 are serially connected, results in the second sequence of square wave voltages including a plurality of square wave voltages that falls to the negative side with a potential at the point c, that is the connecting portion where the first and second switching elements 10 and 11 are serially connected as the second reference potential as illustrated in (C) in FIG. 4.

When the first switching element 10 is switched on and the second switching element 11 is switched off in the first chopper circuit 5, and the third switching element 12 is switched off and the fourth switching element 13 is switched on in the second chopper circuit 6, the second capacitor 18 is charged. When the first switching element 10 is switched off and the second switching element 11 is switched on in the first chopper circuit 5, and the third switching element 12 is switched off and the fourth switching element 13 is switched on in the second chopper circuit 6, the charges stored in the second capacitor 18 are discharged via the switching elements 11 and 13 respectively switched on earlier. The second capacitor 18 is thus charged in charge periods $T_1$ and discharged in discharge periods $T_2$ in turns repeatedly as illustrated in (C) in FIG. 4, which generates the square wave voltage that falls to the negative side with the second reference potential at the point c as the reference potential. The square wave voltage level $Vd_2$ is ½ of the direct current output voltage $Vd_1$ of the solar photovoltaic panel 1 ($Vd_2=-Vd_1$½), for example, 400 V.

The voltage V2 is a voltage at the point e that is the connection portion where the third and fourth switching elements 12 and 13 are serially connected with the point c that is the connection portion where the first and second switching elements 11 and 12 are serially connected as a benchmark. In the second chopper circuit 6, therefore, at the point e is detected the appearance of the voltage V1+V2 (the sum of the voltage V1 in the points a-c in (B) in FIG. 4 and the voltage V2 in the points c-e in (C) in FIG. 4) having the stepwise waveform that changes to the positive and negative sides in turns in response to the changes of the command value V* as the sinusoidal target voltage illustrated in (D) in FIG. 4 with a potential at the point a as the first reference potential. In the second chopper circuit 6, even-order harmonics can be removed because the sequence of square wave voltages that falls to the negative side is generated, and its theoretical effective power is zero since the charge and discharge are repeatedly performed using an equal power.

Figure 9:
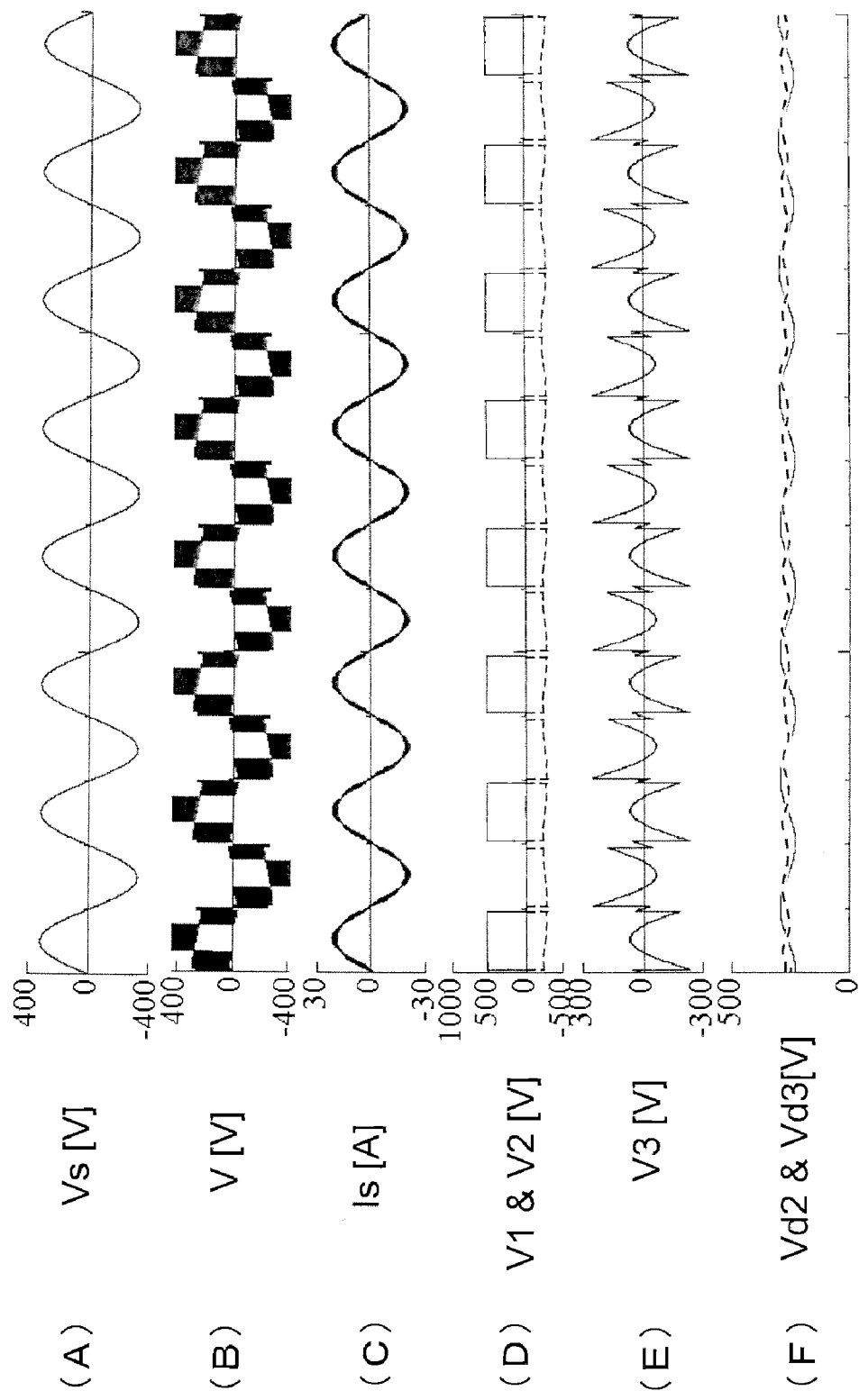
FIG. 9 is drawings illustrating waveforms of the structural elements illustrated in FIG. 1.

The charge and discharge are enabled by the flow of the system current Is illustrated in (C) in FIG. 9, described later, in the second capacitor 18. When the system current Is illustrated in (C) in FIG. 9 is positive, the second capacitor 18 is charged with a sinusoidal wave current in the $T_1$ periods illustrated in (C) in FIG. 4. Therefore, V2 progressively decreases in the $T_1$ periods in practice. When the system current Is illustrated in (C) in FIG. 9 is negative, the sinusoidal wave current is discharged from the second capacitor 18 in the $T_2$ periods illustrated in (C) in FIG. 4. Therefore, V2 progressively increases in practice.

Figure 5:
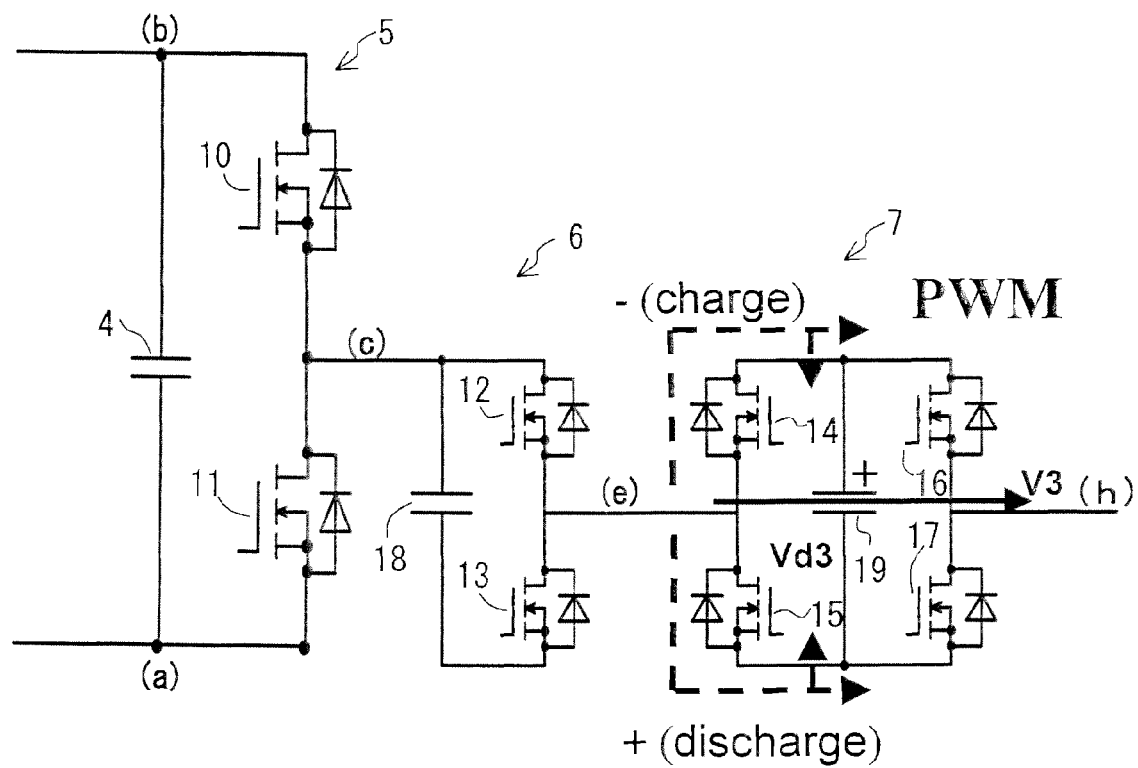
FIG. 5 is an illustration referred to in the description of a theory of operation of a third chopper circuit illustrated in FIG. 1.
Figure 6:
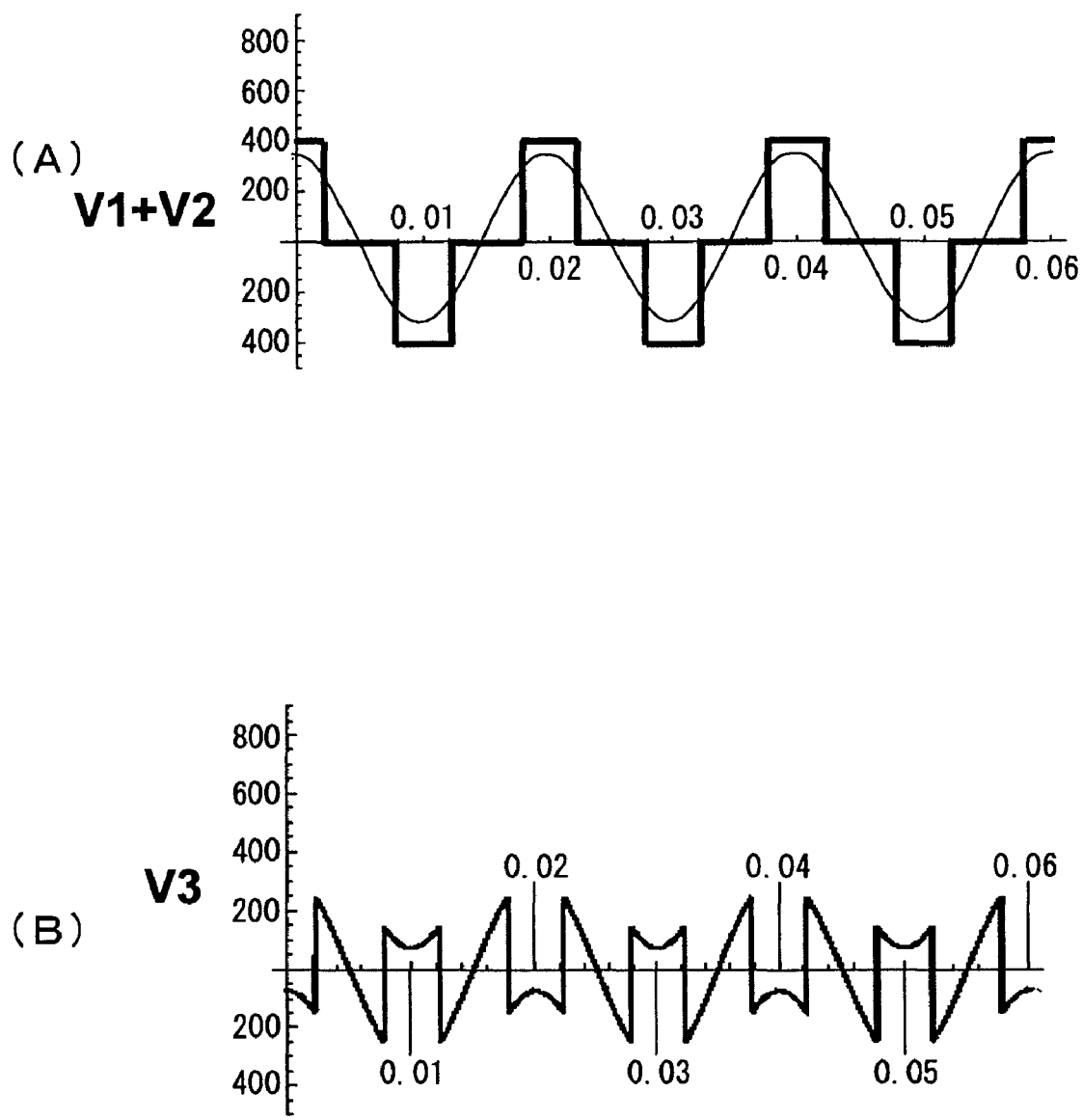
FIG. 6 is drawings illustrating voltage waveforms of structural elements illustrated in FIG. 5.

FIG. 5 is a drawing referred to in the description of the theory of operation of the third chopper circuit 7. (A) in FIG. 6 illustrates the voltage V1+V2 having the stepwise waveform, (B) in FIG. 6 illustrates an PWM mean value of the voltage V3 at the point h that is the connecting portion where the seventh and eighth switching elements 16 and 17 are serially connected with the point e, that is the connecting portion where the fifth and sixth switching elements 14 and 15 are serially connected, as a benchmark. In (A) in FIG. 6, the command value V* as the sinusoidal target voltage is shown in a thin solid line.

The fifth and sixth switching elements 14 and 15 are switched on and off by a timing that depends on if the voltage difference between the voltage V1+V2 having the stepwise waveform at the point e illustrated in (A) in FIG. 6 and the command value V* as the sinusoidal target voltage results in a positive value or a negative value. As a result, the voltage V1+V2 is supplied to and discharged from the third capacitor 19 by the on/off control timing.

In other words, the different voltage shows a positive value as far as the relational expression, voltage V1+V2>command value V* as the sinusoidal target voltage is satisfied, and the fifth switching element 14 is switched on and the sixth switching element 15 is switched off. As a result, the third capacitor 19 is charged with the voltage V1+V2.

The different voltage shows a negative value as far as the relational expression, voltage V1+V2<command value V* as the sinusoidal target voltage is satisfied, and the fifth switching element 14 is switched off and the sixth switching element 15 is switched on. As a result, the voltage charged in the third capacitor 19 is discharged therefrom.

The value of the voltage difference changes by the cycle of 150 Hz, that is the third frequency $f_3$, therefore, the fifth and sixth switching elements 14 and 15 are switched on and off in turns at the third frequency $f_3$.

In the third chopper circuit 7, the seventh and eighth switching elements 16 and 17 are PWM-controlled at a fourth frequency $f_4$, 18 kHz, which is a few hundred times as high as the first frequency $f_1$, based on such a duty that corrects the voltage difference between the voltage V1+V2 and the command value V* as the sinusoidal target voltage. Accordingly, the voltage V3 corresponding to the voltage difference between the voltage V1+V2 having the stepwise waveform and the command value V* as the sinusoidal target voltage appears at the point h that is the connecting portion where the seventh and eighth switching elements 16 and 17 are serially connected as illustrated in (B) in FIG. 6. The voltage V3, representing a PWM average value, is a voltage at the point h that is the connecting portion where the seventh and eighth switching elements 16 and 17 are serially connected with the point e, that is the connecting portion where the fifth and sixth switching elements 14 and 15 are serially connected, as a benchmark.

In the third chopper circuit 7, therefore, at the point h, that is the connecting portion where the seventh and eighth switching elements 16 and 17 are serially connected, is detected the appearance of the command value V* as the sinusoidal target value having a phase in accord with the variation of the power system frequency shown in the thin solid line in (A) in FIG. 6 (the sum of the voltage V1+V2 in the points a-e illustrated in (A) in FIG. 6 and the voltage V3 in points e-h illustrated in (B) in FIG. 6) with the first reference potential at the ground point a as the reference potential.

In the third chopper circuit 7, third-order or higher harmonics can be controlled because the frequency three times as high as the system frequency is used as the chopping frequency, and no voltage difference to the sinusoidal wave voltage is generated.

Below is given a more detailed description of the control of the chopping operations in the chopper circuits 5-7 by the control circuit 9 illustrated in FIG. 1. The control circuit 9 controls pulse widths of the plurality of square wave voltages that rise to the positive side illustrated in (B) in FIG. 3 using the gate signals for the first and second switching elements 10 and 11 of the first chopper circuit 5. More specifically, the control circuit 9 controls the square wave voltages so that a fundamental component of the output voltage of the first chopper circuit 5 is equal to a fundamental component of the system power source, more specifically, so that a pulse width 6 of the square wave voltage results in a value calculated by the following expression.

$$\delta = \sin^{-1}\{(\sqrt{2}\pi V)/(2Vd1)\}$$

V in the expression denotes an effective value of the voltage Vs of the system power source.

When the pulse width δ is adjusted by $\Delta\delta_1$, the fundamental voltage can be increased or decreased. The $\Delta\delta_1$ is calculated by multiplying an error between the measured voltage $Vd_3$ and its target value $Vd_3^*$ by a coefficient.

The control circuit 9 controls the voltage $Vd_2$ illustrated in (C) in FIG. 4 to be reduced to ½ of the voltage $Vd_1$ of the first chopper circuit 5 using the gate signals for the third and fourth switching elements 12 and 13 of the second chopper circuit 6. When the third and fourth switching elements 12 and 13 of the second chopper circuit 6 are switched on and off by the gate signals, the voltage is supplied to and discharged from the second capacitor 18 repeatedly as described earlier, and a sequence of square wave voltages including a large number of square wave voltages that fall to the negative side illustrated in (C) in FIG. 4 are generated. The pulse width of the square wave to be charged in the charge periods T1 is equal to the pulse width of the square wave outputted from the first chopper circuit 5 in the charge periods T1. The pulse width of the square wave to be discharged in the discharge periods T2 is obtained when the pulse width of the square wave to be charged is adjusted by $\Delta\delta_2$.

The $\Delta\delta_2$ is calculated by multiplying an error between the measured voltage and its target voltage Vd2* by a coefficient. The target voltage Vd2* is ½ of the measured voltage Vd1. The control circuit 9 thus controls the pulse width of the square wave voltage in response to the variation of the power output from the solar photovoltaic panel 1.

Figure 7:
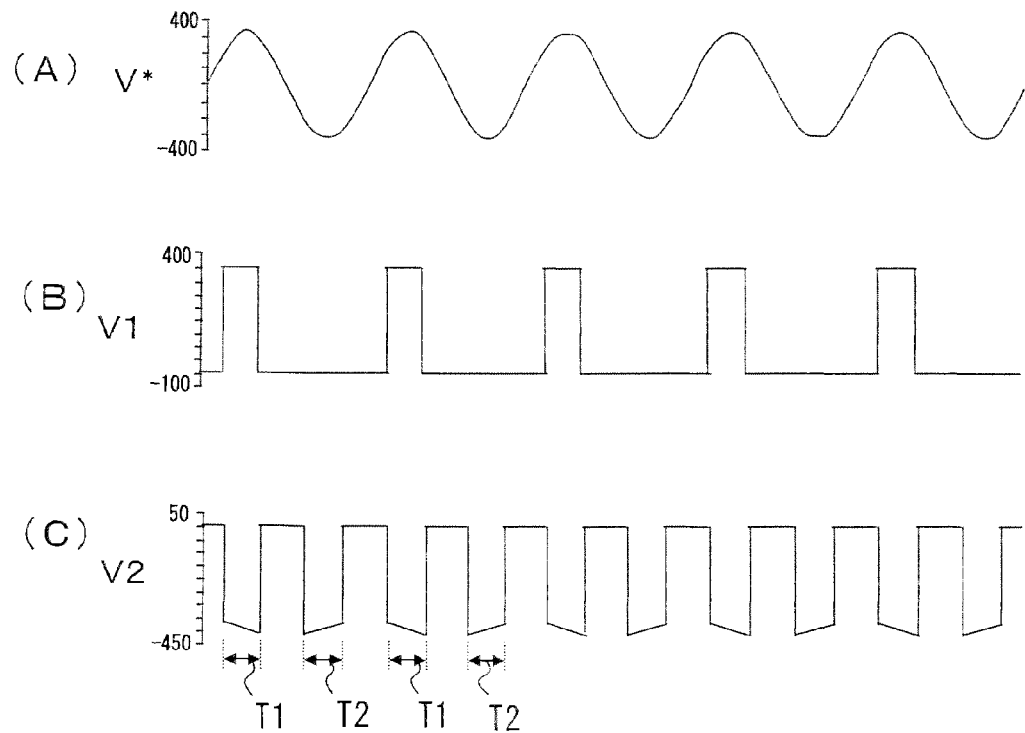
FIG. 7 is drawings illustrating voltages of the structural elements when an inputted voltage is 800 V.
Figure 8:
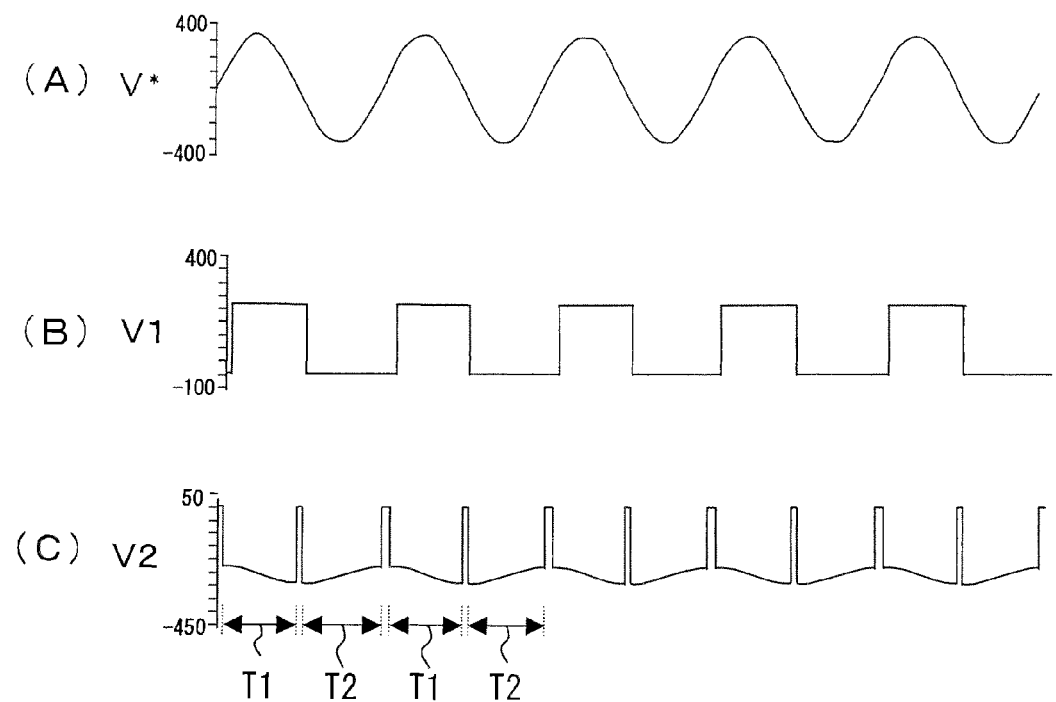
FIG. 8 is drawings illustrating voltages of the structural elements when the inputted voltage is 520 V.

FIGS. 7 and 8 illustrate simulated waveforms of the square wave voltages V1 and V2 on the positive and negative sides as the input voltage Vd1 from the solar photovoltaic panel 1 changes. The input voltage Vd1 is 800 V in FIG. 7, and the input voltage Vd1 is 520 V in FIG. 8.

(A) in FIG. 7 and (A) in FIG. 8 illustrate the command value V* as the sinusoidal target voltage. (B) in FIG. 7 and (B) in FIG. 8 illustrate the positive voltage V1 by the first chopper circuit 5. (C) in FIG. 7 and (C) in FIG. 8 illustrate the negative voltage V2 by the second chopper circuit 6.

It is known from the drawings that the pulse widths of the positive square waves illustrated in (B) in FIG. 8 and the negative square waves illustrated in (C) in FIG. 8 are both widened as the input voltage Vd1 is lower as compared with the illustrations in FIG. 7.

The control circuit 9 switches on and off the fifth and sixth switching elements 14 and 15 of the third chopper circuit 7 by the timing that depends on the voltage difference between the voltage V1+V2 having the stepwise waveform illustrated in (A) in FIG. 6 and the command value V* as the sinusoidal target voltage results in a positive value or a negative value. The control circuit 9 further PWM-controls the seventh and eighth switching elements 16 and 17 at a high frequency based on such a duty that corrects the voltage difference is corrected so that the sinusoidal wave voltage in accord with the command value V* as the target value is generated.

FIG. 9 illustrates simulated waveforms of the respective structural elements of FIG. 1, wherein the ground is used as a benchmark. (A) in FIG. 9 illustrates the system voltage Vs, (B) in FIG. 9 illustrates the output voltage V of the third chopper circuit 7, (C) in FIG. 9 illustrates the system current Is, (D) in FIG. 9 illustrates the voltages V1 and V2 (broken line), (E) in FIG. 9 illustrates the voltage V3, and (F) in FIG. 9 illustrates the voltages Vd2 and Vd3 (broken line).

In the present preferred embodiment, the first and second switching elements 10 and 11 of the first chopper circuit 5 switch on and off, for example, the voltage of 800 V at the first frequency $f_1$, 50 Hz, the third and fourth switching elements 12 and 13 of the second chopper circuit 6 switch on and off, for example, the voltage of 400 V at the second frequency $f_2$, 100 Hz, and the fifth and sixth switching elements 14 and 15 of the third chopper circuit 7 switch on and off, for example, the voltage of 260 V at the third frequency $f_3$, 150 Hz. Thus, these switching elements are switched on and off at the frequencies far below the PWM frequency of the PWM-control inverter in the conventional power conditioner.

The seventh and eighth switching elements 16 and 17 of the third chopper circuit 3 PWM-controls the voltage of about 260 V, which is the voltage difference between the voltage V1+V2 having the stepwise waveform and the command value V* as the sinusoidal target voltage, at such a high frequency as 18 kHz. The seventh and eighth switching elements 16 and 17 thus switch on and off such a low voltage than in the PWM-control inverter of the conventional power conditioner.

As described so far, the first-sixth switching elements 10-15 of the first-third chopper circuits 5-7 are switched on and off at the very low frequencies as compared with the conventional PWM control. Accordingly, switching loss can be lessened, and elements with less conduction loss or more inexpensive elements can be selected as the switching elements. Another technical advantage is that the voltage much lower than in the conventional PWM control is switched on and off by the seventh and eighth switching elements 16 and 17 in the third chopper circuit 3, which also reduces the switching loss. As a result, the power conversion efficiency of the power conditioner 3 can be improved as compared with the conventional power conditioner.

The square wave voltage generator includes the first chopper circuit 5, second chopper circuit 6, the fifth and sixth switching elements 14 and 15 and the third capacitor 19 of the third chopper circuit 7, and the control circuit 9 for controlling these structural elements. The sinusoidal wave voltage generator includes the seventh and eighth switching elements 16 and 17 of the third chopper circuit 7 and the control circuit 9 for controlling these structural elements.

According to the present preferred embodiment, the solar photovoltaic panel 1 has thin solar cells made of amorphous silicon as described earlier. It is a common knowledge that the solar cell made of amorphous silicon is deteriorated over time in the case where its negative-electrode side potential is lower than a ground potential, therefore, the negative potential should be equal to the ground potential. In this regard, the non-insulator power conditioner 36 illustrated in FIG. 17, wherein the different reference potentials are employed for the direct current and alternating current, is unable to set the ground potential on the negative side of the solar cell which is the input side of the power conditioner 36. As opposed to the conventional power conditioner, the ground potential can set on the negative side of the solar cell according to the present invention wherein the same reference potential is employed for the direct current and alternating current.

Figure 10:
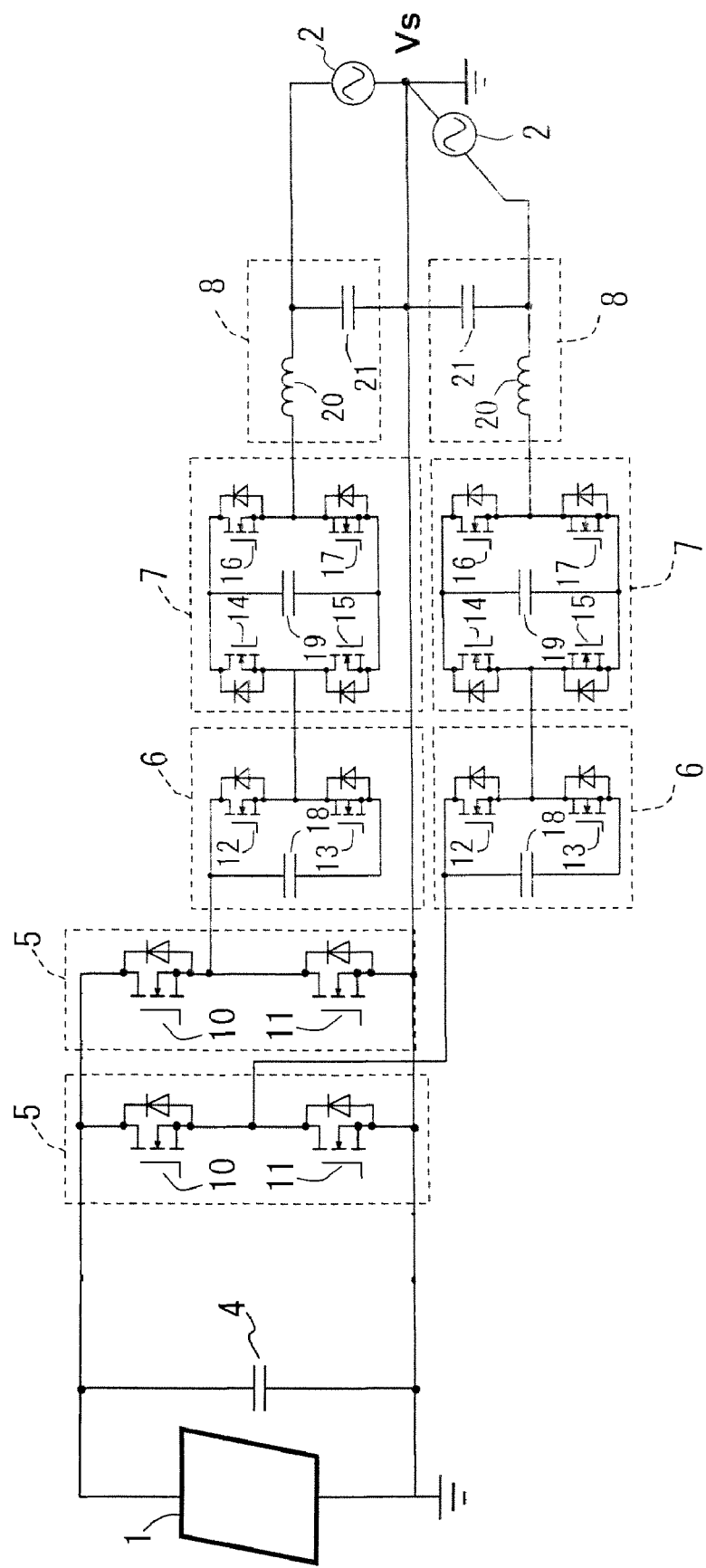
FIG. 10 is an illustration of a single-phase three-wire system.
Figure 11:
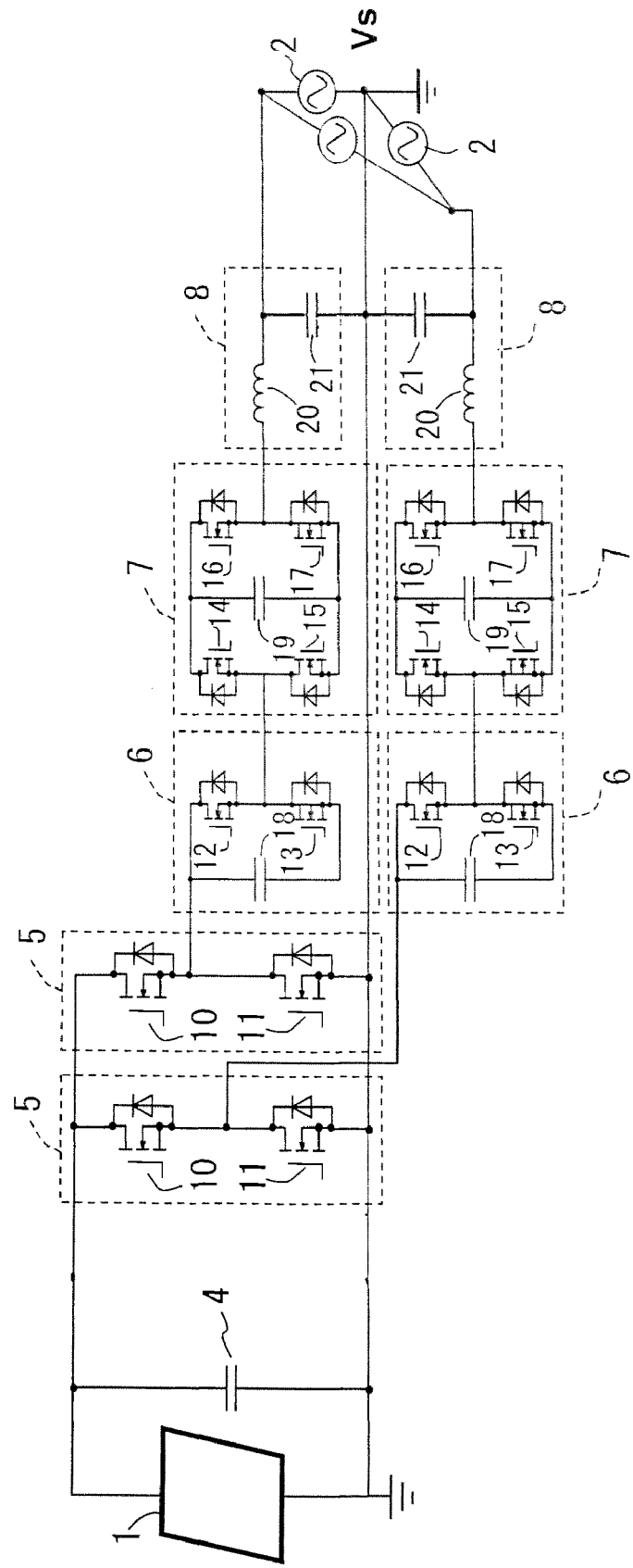
FIG. 11 is an illustration of a three-phase three-wire system.
Figure 12:
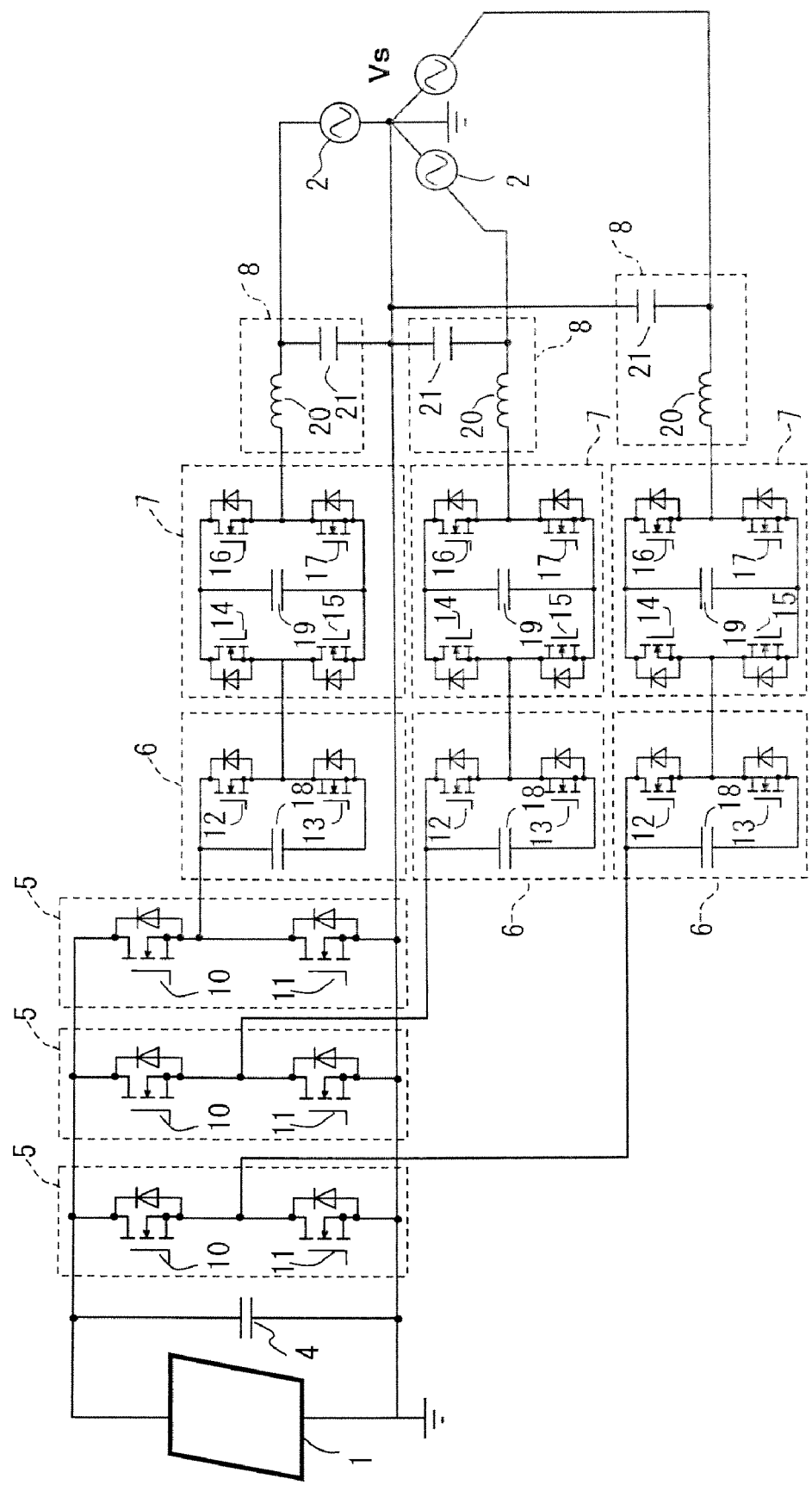
FIG. 12 is an illustration of a three-phase four-wire system.

The present preferred embodiment was described referring to the single-phase two-wire system. As different embodiments of the present invention, any of the single-phase three-wire system illustrated in FIG. 10, three-phase three-wire system illustrated in FIG. 11 and three-phase four-wire system illustrated in FIG. 12 can be employed.

FIG. 13 illustrates comparison of the characteristics of the three-phase four-wire system illustrated in FIG. 5 according to the present preferred embodiment and the characteristics of the conventional system. A horizontal axis denotes the output voltage (W), and a vertical axis denotes the efficiency (%). In the drawing, solid lines denote the characteristics of the present preferred embodiment, wherein the bold solid line denotes the characteristics when SJ (super junction) MOSFET is used as the switching element, the thin solid line denotes the characteristics when IGBT is used as the switching element. A broken line denotes the characteristics of the conventional system.

Figure 14:
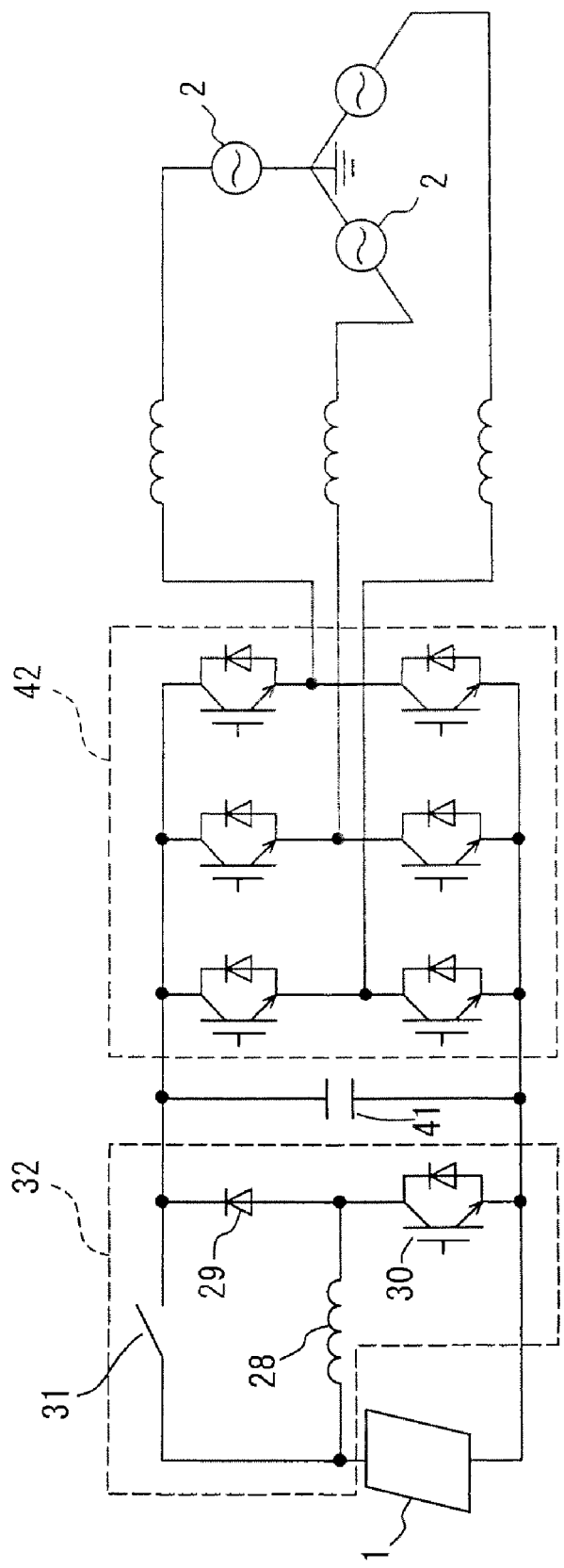
FIG. 14 is a drawing illustrating the conventional system illustrated in FIG. 13.

In the example illustrated in FIG. 13, a line-to-line voltage of the system is 400 V, and the input voltage is 570 V. The conventional apparatus is a non-insulator power conditioner, comprising a reactor 28, a diode 29, a booster circuit 32, a smoothing capacitor 41, and an inverter 42 for PWM control as illustrated in FIG. 14. The booster circuit 32 includes an IGBT 30 and a switch 31. It is known from the illustration of FIG. 13 that the efficiency is improved as compared with the conventional system.

Figure 15:
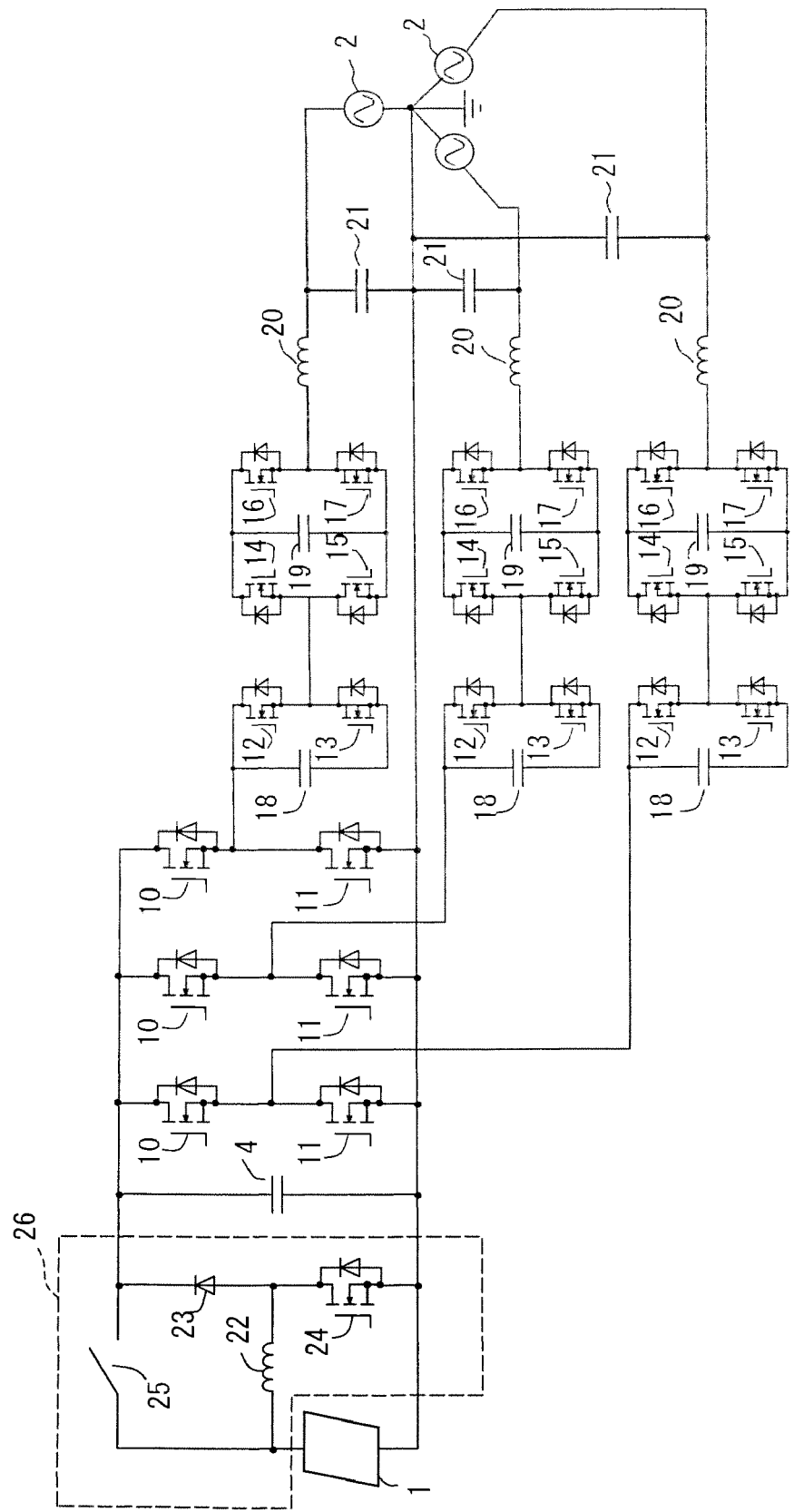
FIG. 15 is a drawing illustrating another preferred embodiment of the present invention.

No booster circuit is provided in the preferred embodiments described so far. In the case where the input voltage from the solar photovoltaic panel 1 drops, however, a booster circuit 26, for example, may be provided in the same manner as the conventional example as illustrated in FIG. 15. The booster circuit 26 includes a reactor 22, a diode 23, a MOSFET 24, and a switch 25.

Figure 16:
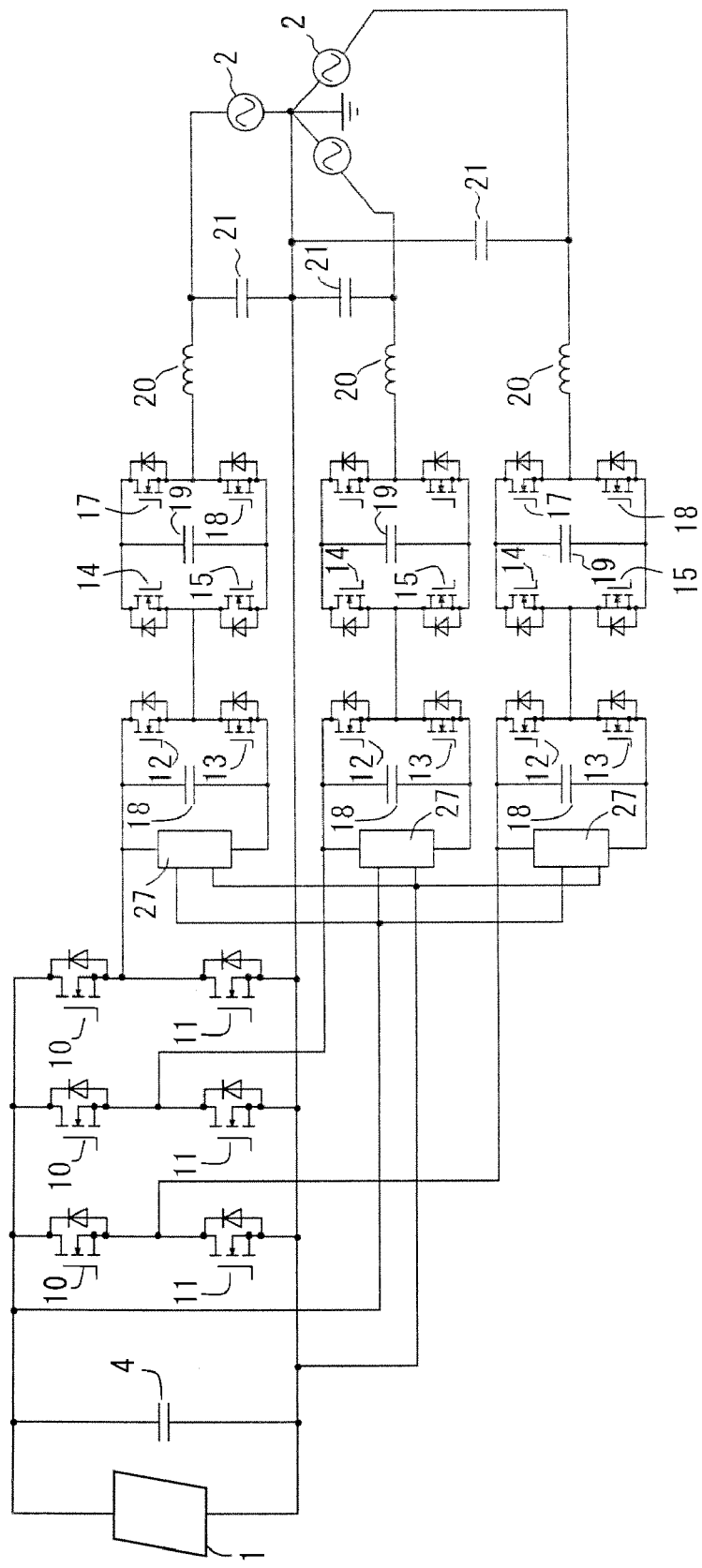
FIG. 16 is a drawing illustrating still another preferred embodiment of the present invention.

It is the second capacitor 18 of the second chopper circuit 6 that first runs short of the voltage when the input voltage from the solar photovoltaic panel 1 falls. Therefore, a conventional insulator booster circuit 27 may be provided before the second capacitor 18 as illustrated in FIG. 16. The booster circuit 27 having a low output capacity thus provided before the second capacitor 18 of the second chopper circuit 6 can deal with the fall of the input voltage, thereby alleviating possible loss.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A power conversion apparatus comprising:
a first square wave voltage generator for chopping a direct current voltage at a first frequency and thereby generating a first sequence of square wave voltages including a plurality of square wave voltages having a voltage level that changes to a positive side relative to a first reference potential;
a second square wave voltage generator for using a potential of the first sequence of square wave voltages as a second reference potential, the second square wave voltage generator chopping an output of the first square wave voltage generator at a second frequency higher than the first frequency and thereby generating a second sequence of square wave voltages including a plurality of square wave voltages having a voltage level lower than the voltage level of the first sequence of square wave voltages on the positive side that changes to a negative side relative to the second reference potential, the second square wave voltage generator further summing the first and second sequences of square wave voltages and thereby generating a third sequence of square wave voltages including a plurality of square wave voltages having a voltage level that changes to the positive and negative sides in turns in the manner of sinusoidal wave relative to the first reference potential;
a third square wave voltage generator for chopping the third sequence of square wave voltages at a third frequency determined by a timing that depends on if a voltage difference thereof to a sinusoidal wave voltage results in a positive value or a negative value and outputting the chopped third sequence of square wave voltages as a charge/discharge output; and a sinusoidal wave voltage generator for PWM-controlling the charge/discharge output of the third square wave voltage generator at a PWM frequency higher than the third frequency so that the voltage difference between the third sequence of square wave voltages and the sinusoidal wave voltage is corrected and gaining the sinusoidal wave voltage that continuously changes to the positive and negative sides relative to the first reference potential using the third sequence of square wave voltages and the PWM-controlled output.

2. The power conversion apparatus as claimed in claim 1, wherein the first square wave voltage generator includes a first switching circuit having first and second two switching elements connected in series to each other, the first switching circuit is connected in parallel to a first capacitor connected to between positive and negative electrodes of a direct current power source, the first and second switching elements are switched on and off in turns at the first frequency, the second square wave voltage generator includes a parallel connection circuit having a second capacitor and a second switching circuit, one parallel connection side of the parallel connection circuit is connected to a connecting portion where the first and second switching elements are serially connected to each other, the second switching circuit has third and fourth two switching elements connected in series to each other, the third and fourth switching elements are switched on and off in turns at the second frequency, the third square wave voltage generator includes a parallel connection circuit having a third capacitor and a third switching circuit, the third switching circuit has fifth and sixth two switching elements connected in series to each other, a connecting portion where the fifth and sixth switching elements are serially connected to each other is connected to a connecting portion where the third and fourth switching elements are serially connected to each other, the fifth and sixth switching elements are switched on and off in turns at the third frequency, the sinusoidal wave voltage generator includes a fourth switching circuit connected in parallel to the parallel connection circuit of the third square wave voltage generator, the fourth switching circuit has seventh and eighth two switching elements connected in series to each other, and the seventh and eighth switching elements are PWM-controlled at the PWM frequency higher than the third frequency.

3. The power conversion apparatus as claimed in claim 1, wherein the first frequency is 50 Hz or 60 Hz equal to a system frequency of a commercial power source, and the second frequency is a frequency twice as high as the first frequency.

4. A power conditioner for converting a direct current power outputted from a direct current power source into an alternating current power for utility interconnection with a commercial power source, comprising:

a first square wave voltage generator for chopping the direct current voltage from the direct power source at a first frequency equal to a system frequency and thereby generating a first sequence of square wave voltages including a plurality of square wave voltages having a voltage level that changes to a positive side relative to a first reference potential;

a second square wave voltage generator for using a potential of the first sequence of square wave voltages as a second reference potential, the second square wave voltage generator chopping an output of the first square wave voltage generator at a second frequency a predetermined number of times as high as the first frequency and thereby generating a second sequence of square wave voltages including a plurality of square wave voltages having a voltage level lower than the voltage level of the first sequence of square wave voltages on the positive side that changes to a negative side relative to the second reference potential, the second square wave voltage generator further generating a third sequence of square wave voltages including a plurality of square wave voltages having a voltage level that changes to positive and negative sides in turns in the manner of sinusoidal wave relative to the first reference potential by summing the first and second sequences of square wave voltages;

a third square wave voltage generator for chopping the third sequence of square wave voltages at a third frequency determined by a timing that depends on if a voltage difference thereof to an output command results in a positive value or a negative value and outputting the chopped third sequence of square wave voltages as a charge/discharge output; and a sinusoidal wave voltage generator for PWM-controlling the charge/discharge output of the third square wave voltage generator at a PWM frequency higher than the third frequency so that the voltage difference between the sequence of square wave voltages and the sinusoidal wave voltage is corrected and gaining the sinusoidal wave voltage that continuously changes to the positive and negative sides relative to the first reference potential using the third sequence of square wave voltages and the PWM-controlled output, the sinusoidal wave voltage generator further outputting the sinusoidal wave voltage to a load.

5. The power conditioner as claimed in claim 4, wherein the first square wave voltage generator includes a first switching circuit having first and second two switching elements connected in series to each other, the first switching circuit is connected in parallel to a first capacitor connected to between positive and negative electrodes of a direct current power source, the first and second switching elements are switched on and off in turns at the first frequency, the second square wave voltage generator includes a parallel connection circuit having a second capacitor and a second switching circuit, one parallel connection side of the parallel connection circuit is connected to a connecting portion where the first and second switching elements are serially connected to each other, the second switching circuit has third and fourth two switching elements connected in series to each other, the third and fourth switching elements are switched on and off in turns at the second frequency, the third square wave voltage generator includes a parallel connection circuit having a third capacitor and a third switching circuit, the third switching circuit has fifth and sixth two switching elements connected in series to each other, a connecting portion where the fifth and sixth switching elements are serially connected to each other is connected to a connecting portion where the third and fourth switching elements are serially connected to each other, the fifth and sixth switching elements are switched on and off in turns at the third frequency, the sinusoidal wave voltage generator includes a fourth switching circuit connected in parallel to the parallel connection circuit of the third square wave voltage generator, the fourth switching circuit has seventh and eighth two switching elements connected in series to each other, and the seventh and eighth switching elements are PWM-controlled at the PWM frequency higher than the third frequency.

6. The power conditioner as claimed in claim 4, wherein the first frequency is 50 Hz or 60 Hz equal to a system frequency of a commercial power source, and the second frequency is a frequency twice as high as the first frequency.

7. The power conditioner as claimed in claim 5, wherein the first frequency is 50 Hz or 60 Hz equal to a system frequency of a commercial power source, and the second frequency is a frequency twice as high as the first frequency.

8. A power generation system comprising:

a direct current power source; and a power conditioner connected to the direct current power source, wherein the power generation system converts a direct current power generated by the direct current power source into an alternating current power using the power conditioner for utility interconnection with a commercial power source, and the power conditioner comprises:

a first square wave voltage generator for chopping the direct current voltage from the direct power source at a first frequency relevant to a system frequency and thereby generating a first sequence of square wave voltages including a plurality of square wave voltages having a voltage level that changes to a positive side relative to the first reference potential;

a second square wave voltage generator for using a potential of the first sequence of square wave voltages as a second reference potential, the second square wave voltage generator chopping an output of the first square wave voltage generator at a second frequency a predetermined number of times as high as the first frequency and thereby generating a second sequence of square wave voltages including a plurality of square wave voltages having a voltage level lower than the voltage level of the first sequence of square wave voltages that changes to a negative side relative to the second reference potential on the positive side, the second square wave voltage generator further generating a third sequence of square wave voltages including a plurality of square wave voltages having a voltage level that changes to the positive and negative sides in turns in the manner of sinusoidal wave relative to the first reference potential by summing the first and second sequences of square wave voltages;

a third square wave voltage generator for chopping the third sequence of square wave voltages at a third frequency determined by a timing that depends on if a voltage difference thereof to a sinusoidal wave voltage results in a positive value or a negative value and outputting the chopped third sequence of square wave voltages as a charge/discharge output; and a sinusoidal wave voltage generator for PWM-controlling the charge/discharge output of the third square wave voltage generator at a PWM frequency higher than the third frequency so that the voltage difference between the sequence of square wave voltages and the sinusoidal wave voltage is corrected and gaining the sinusoidal wave voltage that continuously changes to the positive and negative sides relative to the first reference potential using the third sequence of square wave voltages and the PWM-controlled output, the sinusoidal wave voltage generator further outputting the sinusoidal wave voltage to a load.

* * * * *